United States Patent
Zeng et al.

(10) Patent No.: US 12,179,105 B2
(45) Date of Patent: Dec. 31, 2024

(54) VIRTUAL CHARACTER SELECTION SEQUENCE ADJUSTMENT METHOD AND APPARATUS, DEVICE, STORAGE MEDIUM, AND PRODUCT

(71) Applicant: Tencent Technology (Shenzhen) Company Limited, Shenzhen (CN)

(72) Inventors: Peiyuan Zeng, Shenzhen (CN); Yaowen Zhang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 259 days.

(21) Appl. No.: 17/737,885

(22) Filed: May 5, 2022

(65) Prior Publication Data

US 2022/0379215 A1 Dec. 1, 2022

Related U.S. Application Data

(63) Continuation of application No. PCT/CN2021/124968, filed on Oct. 20, 2021.

(30) Foreign Application Priority Data

Jun. 1, 2021 (CN) .......................... 202110610813.2

(51) Int. Cl.
*A63F 13/20* (2014.01)
*A63F 13/40* (2014.01)
(Continued)

(52) U.S. Cl.
CPC .......... *A63F 13/5372* (2014.09); *A63F 13/40* (2014.09); *A63F 13/52* (2014.09); *A63F 2300/308* (2013.01)

(58) Field of Classification Search
None
See application file for complete search history.

(56) References Cited

U.S. PATENT DOCUMENTS

| | | | |
|---|---|---|---|
| 2013/0244784 A1* | 9/2013 | Assa | G06F 3/0416 463/40 |
| 2017/0197150 A1* | 7/2017 | Nuell | A63F 13/822 |

(Continued)

FOREIGN PATENT DOCUMENTS

| | | |
|---|---|---|
| CN | 101867654 A | 10/2010 |
| CN | 107224720 A | 10/2017 |

(Continued)

OTHER PUBLICATIONS

Baidu, "How to exchange heroes in the ranking of King of Glory", Jan. 5, 2021, 3 pgs., Retrieved from the Internet: https://jingyan.baidu.com/article/148a19218463af0c70c3b168.html.

(Continued)

*Primary Examiner* — Lawrence S Galka
(74) *Attorney, Agent, or Firm* — Morgan, Lewis & Bockius LLP

(57) ABSTRACT

An electronic device displays a first selection screen and displays adjustment controls corresponding to information display positions of at least one second user. The electronic device receives a trigger operation on a first adjustment control. In accordance with the receiving, and responsive to a determination that the first adjustment control is in a first display status, the electronic device displays the first adjustment control in a second display status. In response to a determination that the trigger operation on the first adjustment control is accepted by a first target user, the electronic device displays a second selection screen that includes an exchange in the information display position of the first user and the information display position of the first target user.

(Continued)

The disclosed implementations improve user interaction efficiency during virtual character selection in gaming applications.

20 Claims, 12 Drawing Sheets

(51) Int. Cl.
*A63F 13/52* (2014.01)
*A63F 13/5372* (2014.01)

(56) References Cited

U.S. PATENT DOCUMENTS

| | | |
|---|---|---|
| 2020/0393959 A1 | 12/2020 | Qiu et al. |
| 2021/0060438 A1 | 3/2021 | Oe et al. |

FOREIGN PATENT DOCUMENTS

| | | |
|---|---|---|
| CN | 108057247 A | 5/2018 |
| CN | 110536006 A | 12/2019 |
| CN | 111861598 A | 10/2020 |
| CN | 113274731 A | 8/2021 |
| JP | 2021069646 A | 5/2021 |
| JP | 2021517836 A | 7/2021 |
| TW | 201008617 A | 3/2010 |

OTHER PUBLICATIONS

Tencent Technology, ISR, PCT/CN2021/124968, Feb. 24, 2022, 2 pgs.
Tencent Technology, WO, PCT/CN2021/124968, Feb. 24, 2022, 4 pgs.
Tencent Technology, IPRP, PCT/CN2021/124968, Nov. 21, 2023, 5 pgs.
Tencent Technology, Korean Office Action, KR Patent Application No. 10-2022-7027906, Jun. 7, 2024, 6 pgs.

* cited by examiner

VIRTUAL CHARACTER SELECTION SEQUENCE ADJUSTMENT METHOD AND APPARATUS, DEVICE, STORAGE MEDIUM, AND PRODUCT

CROSS REFERENCE TO RELATED APPLICATIONS

This application is a continuation application of PCT Patent Application No. PCT/CN2021/124968, entitled "METHOD, DEVICE, STORAGE MEDIUM AND PRODUCT FOR ADJUSTING ORDER OF VIRTUAL CHARACTER SELECTION" filed on Oct. 20, 2021, which claims priority to Chinese Patent Application No. 202110610813.2, filed with the State Intellectual Property Office of the People's Republic of China on Jun. 1, 2021, and entitled "VIRTUAL CHARACTER SELECTION SEQUENCE ADJUSTMENT METHOD AND APPARATUS, DEVICE, STORAGE MEDIUM, AND PRODUCT", all of which are incorporated herein by reference in their entirety.

FIELD OF THE TECHNOLOGY

This application relates to the field of virtual scene technologies, and in particular, to a virtual character selection sequence adjustment method and apparatus, a device, a storage medium, and a product.

BACKGROUND OF THE DISCLOSURE

A battle game is a game in which virtual objects controlled by multiple user accounts compete in the same game scene (e.g., battle scene). In a possible implementation, the battle game may be a multiplayer online battle arena (MOBA) game. Before entering a round of game, the terminal needs to select which virtual characters are to be used and which virtual characters are to be banned.

In the related art, when users enter a virtual character selection interface, the game system randomly assigns positions (e.g., levels) where the users are located. During selecting virtual characters, the user on the designated position has the right to select a virtual character and ban (e.g., de-select, disable, etc.) a virtual character, and can only perform corresponding operations in the sequence of the assigned positions.

However, because the positions of the users (and the sequence in which the users can select or de-select virtual characters) on the virtual character selection interface in a preparation stage of each round of game are randomly assigned by the game system, it takes a lot of time for teammates to communicate with each other to complete the selection of the to-be-banned virtual character and the to-be-used virtual character for each user, resulting in a complicated operation process for selecting virtual characters and poor interaction efficiency.

SUMMARY

Embodiments of this application provide a virtual character selection sequence adjustment method and apparatus, a device, a storage medium, and a product. The technical solutions are as follows:

According to one aspect, a virtual character selection sequence adjustment method is provided. The method is performed by a first terminal associated with a first user and includes:

displaying a first selection screen, the first selection screen including an information display position of the first user and information display positions of at least one second user; each of the information display positions being used for indicating a virtual character selection sequence for each of the users;

displaying adjustment controls corresponding to the information display positions of the at least one second user;

receiving a trigger operation on a first adjustment control;

in accordance with the receiving, and responsive to a determination that the first adjustment control is in a first display status, displaying the first adjustment control in a second display status, the first adjustment control is an adjustment control corresponding to the at least one second user; and the second display status is used for indicating to wait for a user to accept a position exchange;

in response to a determination that the trigger operation on the first adjustment control is accepted by a first target user, displaying a second selection screen, the second selection screen being a screen obtained after the information display position of the first user is exchanged with the information display position of the first target user; and the first target user being a user corresponding to the first adjustment control.

According to one aspect, a virtual character selection sequence adjustment apparatus is provided, including:

a first screen display module, configured to display a first selection screen; the first selection screen including an information display position of a first user and information display positions of at least one second user; the information display position being used for indicating a virtual character selection sequence of each user; and the first user being a user corresponding to the first terminal;

a control display module, configured to display adjustment controls corresponding to the information display positions of the at least one second user;

a status adjustment module, configured to display, in response to a first adjustment control being in a first display status and receiving a trigger operation on the first adjustment control, the first adjustment control in a second display status; the first adjustment control being any one of the adjustment controls corresponding to the at least one second user; and the second display status being used for indicating to wait for a user to accept a position exchange;

a second screen display module, configured to display a second selection screen in response to the trigger operation on the first adjustment control being accepted by a first target user, the second selection screen being a screen obtained after the information display position of the first user is exchanged with the information display position of the first target user; and the first target user being a user corresponding to the first adjustment control.

In a possible implementation, the control display module includes:

an information receiving submodule, configured to receive first position status information transmitted by a server, the first position status information being used for indicating an exchange status of the information display positions of the at least one second user; and a control display submodule, configured to display the adjustment controls corresponding to the information display positions of the at least one second user based on the first position status information.

In a possible implementation, the control display submodule includes:
  a first status display unit, configured to display a second adjustment control in the first display status in response to the first position status information indicating that the information display position of the second target user has not been exchanged, the second target user being any one of the at least one second user, and the second adjustment control being the adjustment control corresponding to the second target user;
  a second status display unit, configured to display the second adjustment control in a third display status in response to the first position status information indicating that the second target user requests for an information display position exchange with the first user,
  a third status display unit, configured to display the second adjustment control in a fourth display status or cancel displaying the second adjustment control in response to the first position status information indicating that the information display position of the second target user has been exchanged; and the fourth display status being an inoperable status.

In a possible implementation, the at least one second user includes at least two users; and
  the control display submodule includes:
  a first control display unit, configured to display, in response to the first position status information indicating that a third target user requests for a position exchange with a fourth target user, a first indication control corresponding to the information display position of the third target user, the first indication control being used for indicating that an exchange object applied for by the third target user is the fourth target user,
  the third target user and the fourth target user being any two of the at least two users.

In a possible implementation, the at least one second user includes at least two users; and
  the control display submodule includes:
  a second control display unit, configured to display, in response to the first position status information indicating that a third target user requests for a position exchange with a fourth target user, a second indication control corresponding to the information display position of the fourth target user, the second indication control being used for indicating that a user who applies for the position exchange with the fourth target user is the third target user,
  the third target user and the fourth target user being any two of the at least two users.

In a possible implementation, the at least one second user includes at least two users; and
  the control display submodule includes:
  a fourth status display unit, configured to display a third adjustment control and a fourth adjustment control in a fourth display status in response to the first position status information indicating that a third target user requests for a position exchange with a fourth target user; the fourth display status being an inoperable status; the third adjustment control being the adjustment control corresponding to the third target user; and the fourth adjustment control being the adjustment control corresponding to the fourth target user.

In a possible implementation, the apparatus further includes:
  a fifth status display unit, configured to display the adjustment controls corresponding to the at least one second user in the fourth display status during displaying of the second selection screen; or
  a first control cancellation unit, configured to cancel displaying the adjustment controls corresponding to the at least one second user during displaying of the second selection screen.

In a possible implementation, the apparatus further includes:
  a sixth status display unit, configured to display the second adjustment control in the fourth display status in response to the second target user completing the virtual character selection; or
  a second control cancellation unit, configured to cancel displaying the second adjustment control in response to the second target user completing the virtual character selection.

In a possible implementation, the status adjustment module includes:
  a request transmission submodule, configured to transmit a position adjustment request to the server in response to the first adjustment control being in the first display status and receiving the trigger operation on the first adjustment control, the position adjustment request being used for requesting for a position exchange with the first target user;
  a second information receiving submodule, configured to receive second position status information transmitted by the server, the second position status information being generated by the server based on the position adjustment request; and
  a status display submodule, configured to display the first adjustment control in the second display status based on the second position status information.

In a possible implementation, the second screen display module includes:
  a third information receiving submodule, configured to receive third position status information transmitted by the server, the third position status information being generated by the server in response to the trigger operation on the first adjustment control being accepted by the first target user; and
  a first screen display submodule, configured to display the second selection screen based on the third position status information.

In a possible implementation, the second screen display module includes:
  an animation display submodule, configured to display an exchange animation for exchanging the information display position of the first user with the information display position of the first target user in response to the trigger operation on the first adjustment control being accepted by the first target user; and
  a second screen display submodule, configured to display the second selection screen in response to completing the exchange animation display.

In a possible implementation, the apparatus further includes:
  a status cancellation module, configured to: before the second selection screen is displayed in response to the trigger operation on the first adjustment control being accepted by the first target user, adjust a display status of the first adjustment control from the second display status to the first display status in response to receiving the trigger operation on the first adjustment control in the second display status.

According to another aspect, an embodiment of this application provides a computer device (e.g., an electronic device), including a processor and a memory, the memory storing at least one computer instruction, the at least one computer instruction being loaded and executed by the processor to implement the virtual character selection sequence adjustment method according to the foregoing aspect.

According to another aspect, an embodiment of this application provides a non-transitory computer-readable storage medium, storing at least one instruction, at least one program, a code set or an instruction set, the at least one instruction, the at least one program, the code set or the instruction set being loaded and executed by a processor to implement the virtual character selection sequence adjustment method according to the foregoing aspect.

According to an aspect of this application, a computer program product or a computer program is provided, the computer program product or the computer program including computer instructions, the computer instructions being stored in a computer-readable storage medium. A processor of a terminal reads the computer instructions from the computer-readable storage medium, and executes the computer instructions, so that the terminal performs the virtual character selection sequence adjustment method provided in the implementations of the foregoing aspect.

The technical solutions provided in the embodiments of this application have at least the following beneficial effects:

By displaying an information display position of a first user and information display positions of at least one second user, a virtual character selection sequence of a corresponding user can be determined based on the information display position. By displaying an adjustment control at the information display position of the second user, and performing a trigger operation on a first adjustment control, a display status of the first adjustment control can be adjusted from a first display status to a second display status. After a first target user corresponding to the first adjustment control agrees to an information display position exchange, a screen generated after the position exchange is displayed, so that a first terminal completes the adjustment of the virtual character selection sequence. After the trigger operation on the first adjustment control is received, the display status of the first adjustment control changes, to prompt the first user that a position exchange has been applied for to the first target user, which can improve the visual effect during position exchange, and improve the interaction efficiency during position exchange, thereby improving the user interaction efficiency during virtual character selection.

It is to be understood that the foregoing general descriptions and the following detailed descriptions are merely for illustration and explanation purposes and are not intended to limit this application.

BRIEF DESCRIPTION OF THE DRAWINGS

Accompanying drawings herein are incorporated into a specification and constitute a part of this specification, show embodiments that conform to this application, and are used for describing a principle of this application together with this specification.

DESCRIPTION OF EMBODIMENTS

Exemplary embodiments are described in detail herein, and examples of the exemplary embodiments are shown in the accompanying drawings. When the following description involves the accompanying drawings, unless otherwise indicated, the same numerals in different accompanying drawings represent the same or similar elements. The implementations described in the following exemplary embodiments do not represent all implementations that are consistent with this application. On the contrary, the implementations are merely examples of apparatuses and methods that are described in detail in the appended claims and that are consistent with some aspects of this application.

Figure 1:
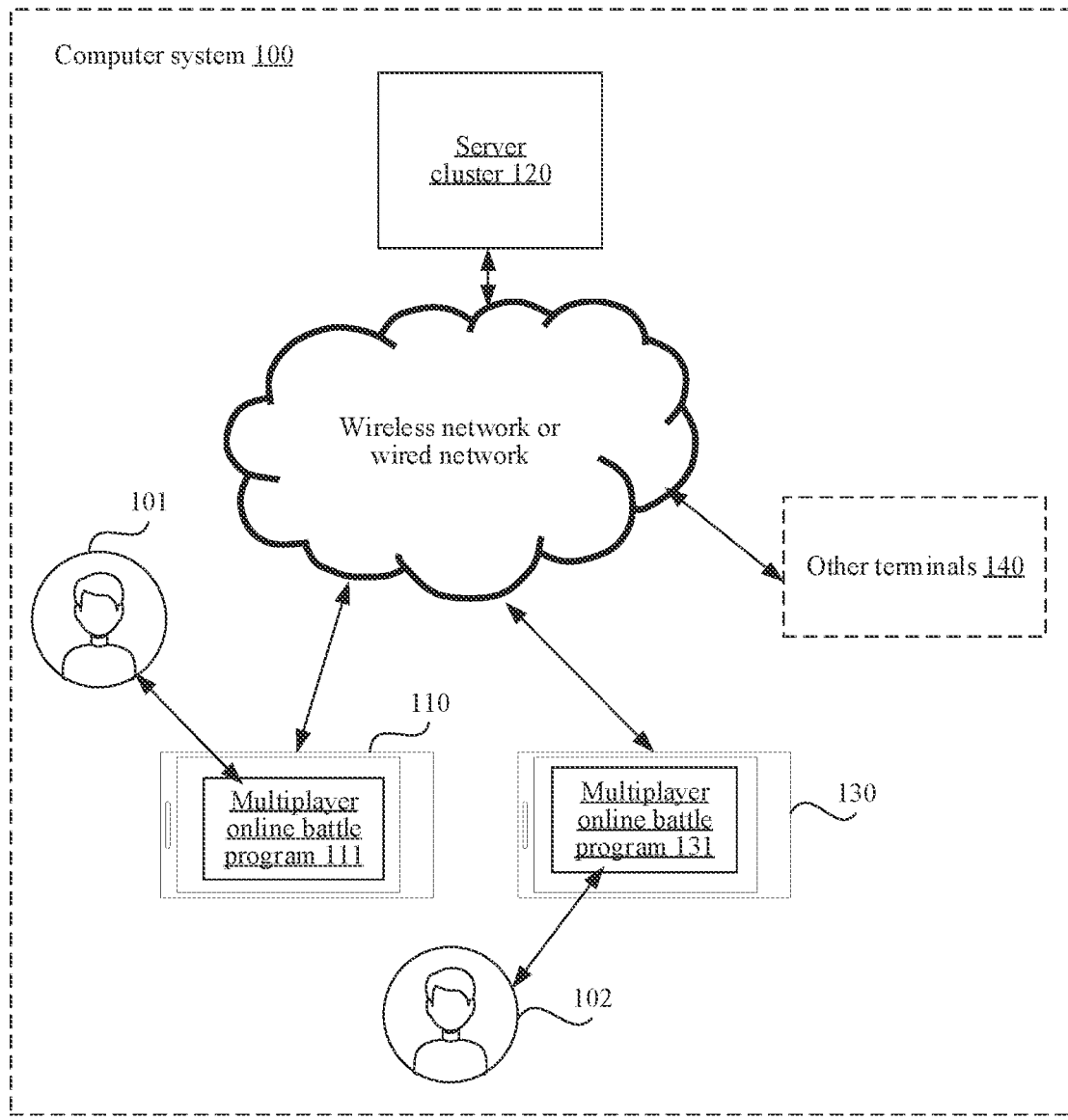
FIG. 1 is a structural block diagram of a computer system according to an exemplary embodiment of this application.

First, terms involved in the embodiments of this application are introduced as follows:

FIG. 1 is a structural block diagram of a computer system according to an exemplary embodiment of this application. The computer system 100 includes: a first terminal 110, a server cluster 120, and a second terminal 130.

A client 111 supporting a virtual scene is installed and run on the first terminal 110, and the client 111 may be a multiplayer online battle program. When the first terminal runs the client 111, a user interface of the client 111 is displayed on a screen of the first terminal 110. The client may be any one of a military simulation program, a MOBA game, an escape shooting game, and a simulation game (SLG). In this embodiment, an example in which the client is a MOBA game is used for description. The first terminal 110 is a terminal used by a first user 101. The first user 101 uses the first terminal 110 to control a first virtual character located in the virtual scene to perform activities, and the first virtual character may be referred to as a master virtual character of the first user 101.

A client 131 supporting a virtual scene is installed and run on the second terminal 130, and the client 131 may be a multiplayer online battle program. When the second terminal 130 runs the client 131, a user interface of the client 131 is displayed on a screen of the second terminal 130. The client may be any one of a military simulation program, a MOBA game, an escape shooting game, and a simulation game (SLG). In this embodiment, an example in which the client is a MOBA game is used for description The second terminal 130 is a terminal used by a second user 102. The second user 102 uses the second terminal 130 to control a second virtual character located in the virtual scene to perform activities, and the second virtual character may be referred to as a master virtual character of the second user 102.

In some embodiments, the client installed on the first terminal 110 is the same as the client installed on the second terminal 130, or the clients installed on the two terminals are the same type of clients of different operating system platforms (Android or iOS). The first terminal 110 may generally refer to one of a plurality of terminals, and the second terminal 130 may generally refer to another one of the plurality of terminals. In this embodiment, only the first terminal 110 and the second terminal 130 are used as an example for description. Device types of the first terminal 110 and the second terminal 130 are the same or different. The device type includes at least one of a smart phone, a tablet computer, an ebook reader, a moving picture experts group audio layer III (MP3) player, a moving picture experts group audio layer IV (MP4) player, or a laptop computer.

FIG. 1 shows only two terminals. However, a plurality of other terminals 140 may access the server cluster 120 in different embodiments. In some embodiments, there are one or more terminals 140 that are terminals corresponding to developers.

The first terminal 110, the second terminal 130, and the other terminals 140 are connected to the server cluster 120 by a wireless network or a wired network.

The server cluster 120 includes at least one of one server, a plurality of servers, a cloud computing platform, or a virtualization center. The server cluster 120 is configured to provide a backend service for a client supporting a three-dimensional virtual scene. In some embodiments, the server cluster 120 is responsible for primary computing work, and the terminal is responsible for secondary computing work, or the server cluster 120 is responsible for secondary computing work, and the terminal is responsible for primary computing work; Alternatively, a distributed computing architecture is adopted between the cloud server cluster 120 and the terminal to perform collaborative computing.

Figure 2:
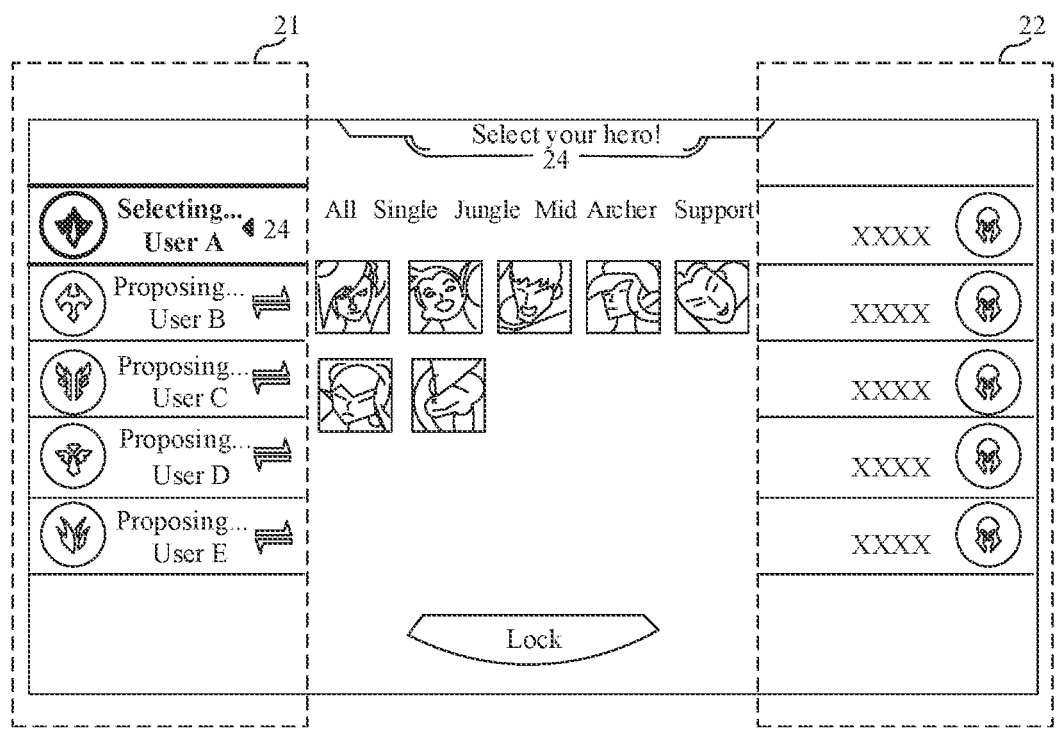
FIG. 2 is a schematic diagram of a virtual character selection interface of a MOBA game according to an exemplary embodiment of this application.

FIG. 2 is a schematic diagram of a virtual character selection interface in a MOBA game according to an exemplary embodiment of this application. As shown in FIG. 2, in a round of game, a target quantity (e.g., number) of virtual characters may be included. Correspondingly, a target quantity of users may participate in the round of game, and the users participating in the round of game may be obtained by matching the target quantity of user accounts online by a server. For example, the server matches 2, 6, or 10 user accounts online for competition in the same virtual scene. The virtual characters controlled by the 2, 6, or 10 user accounts are on two opposing camps (e.g., groups, teams, etc.). The two camps have the same quantity of corresponding virtual characters. That is, each camp includes one or more virtual characters such as 1, 3 or 5. For example, as shown in FIG. 2, 10 virtual characters may be included in a round of virtual game, and there are 5 virtual characters on each camp. Types of the 5 virtual characters may be a warrior character, an assassin character, a mage character, a support (or meat shield) character, and an archer character respectively. The battle may take place in rounds. The same map or different maps may be used in different rounds of battle.

In a preparation stage of each round of game, a virtual character selection interface may be displayed on a control terminal corresponding to each user, and the virtual character selection interface includes a display region 21 in a camp to which the user account of the user belongs, and a display region 22 in an enemy camp. The display regions 21 and 22 are used for indicating a virtual character selection sequence of each user in the camp. As used herein, the display region 21 and the display region 22 are also known as a "floor display region," meaning that each of the display regions includes one or more "floors" or positions corresponding to an order in which a player can select or de-select a virtual character.

As shown in FIG. 2, the two camps each includes 5 virtual characters. If the user account corresponding to the current terminal belongs to a camp (e.g., a team) corresponding to display region 21 (e.g., virtual character selection region), floors corresponding to all users are sequentially determined from top to bottom based on the floor display positions corresponding to all users in the floor display region 21. That is, a floor corresponding to user A is a first floor (e.g., a first position, a first order, etc.), a floor corresponding to user B is a second floor (e.g., a second position, a second order, etc.), a floor corresponding to user C is a third floor (e.g., a third position, a second order, etc.), and so on. During virtual character selection, the user in this camp and the user in the enemy camp sequentially select the virtual character. During each virtual character selection, a user in this camp may select the virtual character. For example, when this camp is the first to select the virtual character, user A on the first floor has the right to preferentially select the virtual character first. After user A on the first floor in this camp completes the of the virtual character selection, it is the turn for the user on the first floor in the enemy camp to select the virtual character. After the user on the first floor in the enemy camp completes the virtual character selection, it is the turn for user B on the second floor in this camp to select the virtual character, and so on. After all users completes the virtual character selection, the users enter a round of game.

The MOBA game is a game in which several bases are provided in a virtual scene, and users on different camps control virtual characters to battle in the virtual scene, and occupy bases or destroy bases of the enemy camp. For example, in the MOBA game, the users may be divided into two opposing camps. The virtual characters controlled by the users are scattered in the virtual scene to compete with each other, and the victory condition is to destroy or occupy all enemy bases. The MOBA game uses round as a unit. A duration of a round of the MOBA game is from a time point at which the game starts to a time point at which the victory condition is met.

During the MOBA game, when the user is preparing for the round of game, the terminal may display a virtual character selection interface, and display floor information of the two camps in the virtual character selection interface.

Based on the floor information of this camp displayed in the virtual character selection interface, when it is the turn for the user to select the virtual character according to a floor sequence, the user may select the desired virtual character. The virtual character is a main target controlled by each user in the MOBA game. The user on the target floor has the right to select a to-be-banned virtual character in the round of game. Before a process of selecting the to-be-used virtual character is started, a process of selecting the to-be-banned virtual character starts. In this case, if the floor sequence is on a floor with banning right of the virtual character, when it is the turn for the user to ban the virtual character according to the floor sequence with the banning right of the virtual character, the user may select the virtual character that needs to be banned in the round of game. After the to-be-banned virtual character is selected, the process of selecting the to-be-used virtual character starts. The users may select different virtual characters from the virtual character selection interface according to the selection sequence indicated by the floor information, to enter the round of game. A virtual character selection function and a virtual character banning function included in the virtual character selection interface are both related to the floor where the user is located in this camp, and in the related art, the floors where all users enter the virtual character selection interface are randomly assigned, so that the user selects or bans the virtual character in an inactive status. Therefore, this application provides a virtual character selection sequence adjustment solution to resolve the problem that the randomly assigned virtual character selection sequence does not conform to the tactical arrangement in this camp, which results in low efficiency of the virtual character selection. In addition, the solution can also meet the needs of the user to preferentially select the virtual character and to preferentially ban the virtual character, thereby reducing the dispute of the users over the virtual character selection and the virtual character banning during preparing for the round of game, and purifying the environment atmosphere of the game.

Figure 3:
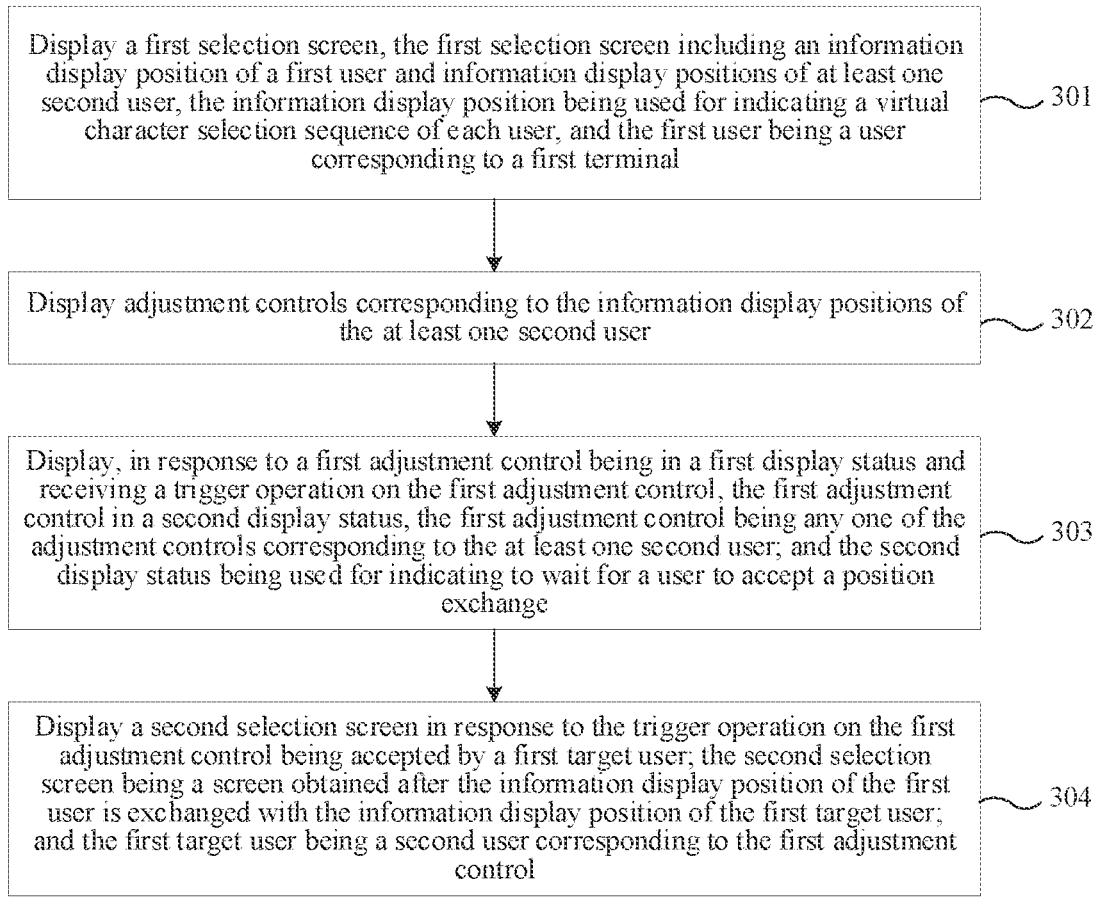
FIG. 3 is a flowchart of a virtual character selection sequence adjustment method according to an exemplary embodiment of this application.

FIG. 3 is a flowchart of a virtual character selection sequence adjustment method according to an exemplary embodiment of this application. The virtual character selection sequence adjustment method may be performed by a computer device. The computer device may be a terminal or a server, or the computer device may include a terminal and a server, where the terminal may be a first terminal. For example, the first terminal may be the first terminal in the system shown in FIG. 1. As shown in FIG. 3, the virtual character selection sequence adjustment method may include the following steps.

Step 301. Display a first selection screen, the first selection screen including an information display position of a first user and information display positions of at least one second user; the information display position being used for indicating a virtual character selection sequence of each user; and the first user being a user corresponding to the first terminal. For example, the information display position is similar to the pick-and-ban order in the computer game industry that once a virtual character is selected (or picked) by one side, the other side will be prevented (or banned) from selecting the same virtual character.

The first selection screen is a screen displayed in a virtual character selection interface, and after each user enters the virtual character selection interface, a process of selecting a virtual character to be banned in the game and/or a process of selecting a virtual character to be used in the game may be directly started according to the information display position in the first selection screen.

In the embodiments of this application, when the first user and the at least one second user are matched by the server to compete in the same virtual scene, the first terminal may preferentially display the virtual character selection interface to indicate that the round of game is currently in a preparation stage.

In a possible implementation, the information display position of the first user and the information display positions of the at least one second user in the first selection screen may be randomly assigned by the server, and the information display position may be used for indicating a floor where the user is located in the virtual character selection interface. The first user and the at least one user are randomly matched by the server to enter the same round of virtual game, or the first user and the at least one user are matched to enter the same virtual of round game based on the same link, or by inputting the same invitation code or inputting the same room number.

Step 302. Display adjustment controls corresponding to the information display positions of the at least one second user.

Step 303. Display the first adjustment control in a second display status in response to: (i) a first adjustment control being in a first display status and (ii) receiving a trigger operation on the first adjustment control, the first adjustment control being any one of the adjustment controls corresponding to the at least one second user; and the second display status indicates a user is waiting to accept a position exchange.

In the embodiments of this application, when the first adjustment control is in the first display status and the trigger operation on the first adjustment control is received, a display status of the first adjustment control is adjusted from the first display status to the second display status.

The first display status may be used for indicating that the adjustment control at the current moment is in an operable status of the trigger operation. The second display status may be used for indicating that the information display position corresponding to the first adjustment control is currently in a status in which the information display position exchange is applied for.

Step 304. Display a second selection screen in response to the trigger operation on the first adjustment control being accepted by a first target user, the second selection screen being a screen obtained after the information display position of the first user is exchanged with the information display position of the first target user; and the first target user being a user corresponding to the first adjustment control.

When the first target user accepts the trigger operation by the first user on the first adjustment control, the first terminal displays a second selection screen generated after the information display position of the first user is exchanged with the information display position of the first target user.

In summary, in this application, by displaying an information display position of a first user and information display positions of at least one second user, a virtual character selection sequence of a corresponding user can be determined based on the information display position. By displaying an adjustment control at the information display position of the second user, and performing a trigger operation on a first adjustment control, a display status of the first adjustment control can be adjusted from a first display status to a second display status. After a first target user agrees to an information display position exchange, a screen generated after the position exchange is displayed, so that a first terminal completes the adjustment of the virtual character selection sequence. After the trigger operation on the first adjustment control is received, the display status of the first adjustment control changes, to prompt the first user that a position exchange has been applied for to the first target user, which can improve the visual effect during position exchange, and improve the interaction efficiency during position exchange, thereby improving the user interaction efficiency during virtual character selection.

In a traditional MOBA mobile game, functions such as "help select" and "help ban" are provided in a virtual character selection stage to preferentially select the to-be-used virtual character, or preferentially select the to-be-banned virtual character. For example, in the current MOBA mobile game, the user usually uses the "help select" function. That is, the user preselects a virtual character, and after performing a trigger operation on the target control, the user transmits a help select request to the user who is currently selecting a virtual character. If the user who is currently selecting a virtual character agrees to the help select request, the user directly selects the preselected virtual character and exchanges the floor with the user who agrees to the help, which can resolve the needs of preferentially selecting the to-be-used virtual character by the user to a specific extent. However, during using the "help select" function, after the floor is exchanged, the user cannot change the preselected virtual character, the round of selection in this camp is forcibly ended, and it is the turn of the enemy camp to select a virtual character. The "help ban" function means that the user may deliver a to-be-banned virtual character of the user through text information, but the decision-making right to select the to-be-banned virtual character is at the user on the target floor. The user who does not have the right to select the to-be-banned virtual character cannot select. Therefore, the foregoing solution cannot resolve the user's appeal to preferentially select the to-be-banned virtual character. In addition, an interaction manner of the "help select" function is rather commanding and coercive, which does not reflect the sense of respect between players, and affects the game atmosphere.

The solutions shown in the embodiments of this application can resolve the problem that no user in the traditional MOBA mobile game actively preferentially selects the to-be-used virtual character or selects the to-be-banned virtual character. The users exchange the to-be-used virtual character selection sequence and the to-be-banned virtual character selection sequence while exchanging the floors on which the users are located, which solves the problem that users cannot obtain the virtual characters they want to use first, or select the to-be-banned virtual character. Accordingly, disputes about heroes in the game are reduced, player conflicts are reduced, and the game atmosphere is optimized.

Figure 4:
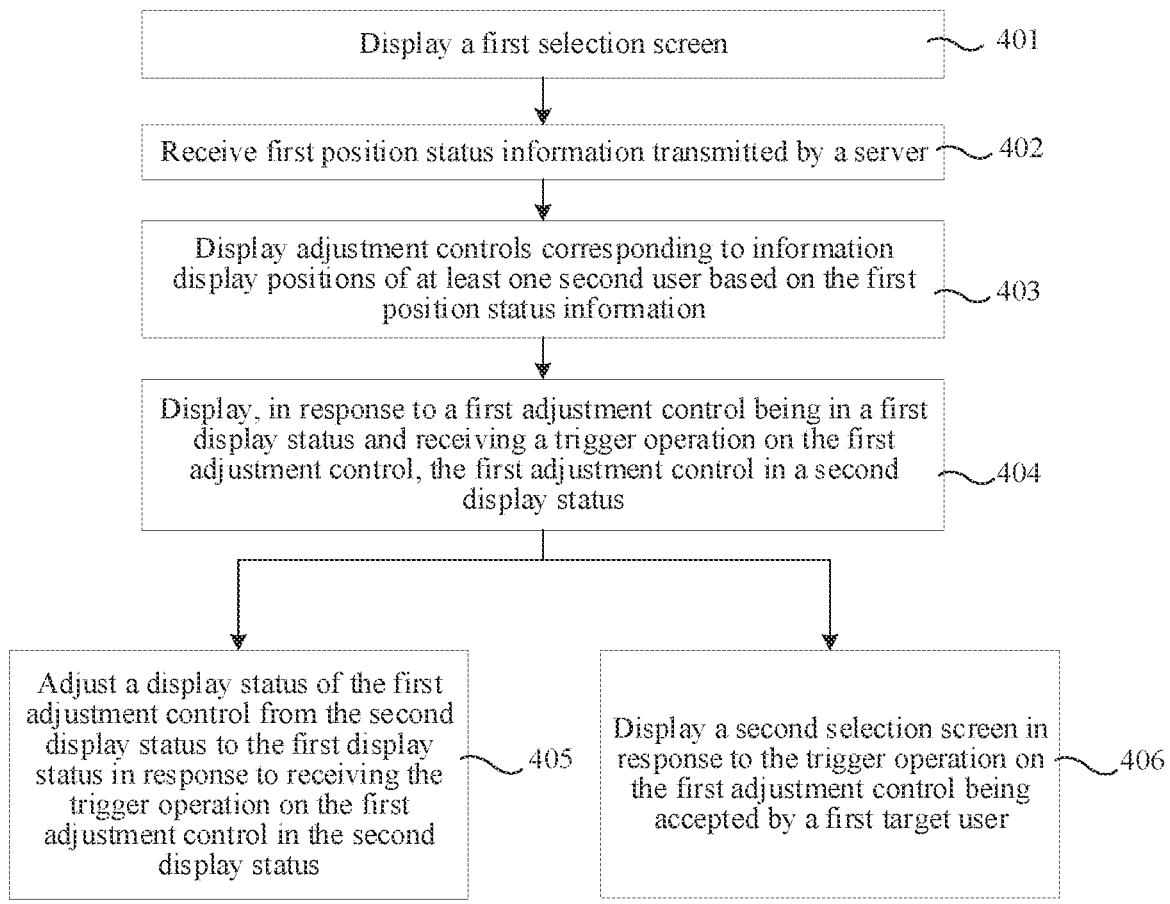
FIG. 4 is a flowchart of a virtual character selection sequence adjustment method according to an exemplary embodiment of this application.

Using a virtual character selection process of a battle preparation stage in the game scene as an example, FIG. 4 is a flowchart of a virtual character selection sequence adjustment method according to an exemplary embodiment of this application. For example, the virtual character selection sequence adjustment method is performed by a first terminal. As shown in FIG. 4, the virtual character selection sequence adjustment method may include the following steps:

Step 401. Display a first selection screen.

In the embodiments of this application, the first terminal displays a virtual character selection interface, the virtual character selection interface may include a first selection screen, and the first selection screen may include an information display position of a first user and information display positions of at least one second user. The information display position may be used for indicating a virtual character selection sequence of a corresponding user, the first user may be a user corresponding to the first terminal, and the at least one second user may be users corresponding to at least one second terminal.

In a possible implementation, the first terminal and the second terminal simultaneously display the virtual character selection interface in the battle preparation stage, the first user selects a to-be-used virtual character and selects a to-be-banned virtual character in the virtual character selection interface displayed on the first terminal, and the second user selects a to-be-used virtual character and selects a to-be-banned virtual character in the virtual character selection interface displayed on the second terminal corresponding to the second user.

The information display position of the first user and the information display positions of the at least one second user included in the first selection screen may be sequentially arranged from top to bottom in the virtual character selection sequence.

The first user and the second user may be in the same camp, and the information display positions of the users in the same camp may be exchanged.

Figure 5:
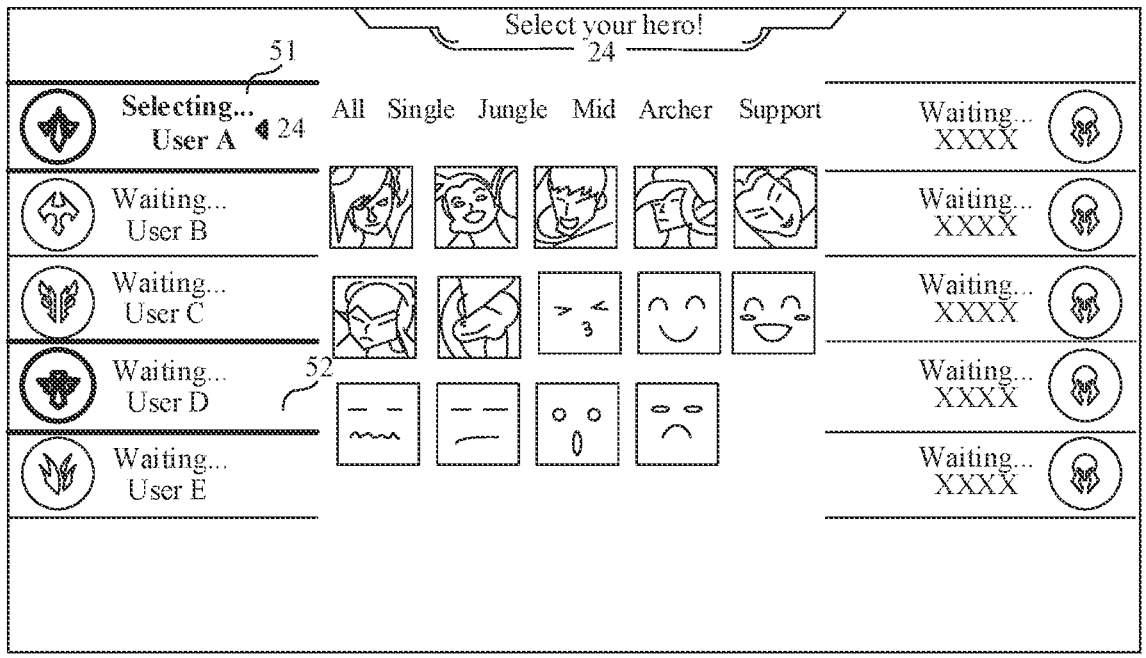
FIG. 5 is a schematic diagram of a virtual character selection interface involved in the embodiment shown in FIG. 4.

For example, FIG. 5 is a schematic diagram of a virtual character selection interface according to some embodiments of this application. As shown in FIG. 5, the first user and all second users enter the virtual character selection interface. If the first user is user D, it can be determined that an information display position 52 of user D is on the fourth floor (e.g., the fourth position) of all information display positions in this camp. That is, user D in this camp may be the fourth person in his camp to select the virtual character. An information display position 51 of user A in this camp is ranked on the first floor of all information display positions in this camp, and therefore user A currently in this camp automatically enters a status in which the virtual character is being selected when starting the virtual character selection.

Step 402. Receive a first position status information transmitted by a server.

In the embodiments of this application, the first terminal receives first position status information transmitted by a server, the first position status information being used for indicating an exchange status of the information display positions of at least one second user.

The exchange status may include a non-exchange status, an exchanged status, and a status in which an exchange request is received.

In a possible implementation, the first position status information includes at least one of control status information, adjustment status information corresponding to the at least one second user, or application relationship information.

The control status information may be used for indicating a display status corresponding to each adjustment control in the virtual character selection interface of the first terminal; the adjustment status information corresponding to the at least one second user may be used for indicating an adjustment of the information display positions of the at least one second user stored in the server most recently; and the application relationship information may be used for indicating a correspondence that is between a user who submits an application and a corresponding user who receives the application and that is indicated by an adjustment application received by the server.

Step 403. Display adjustment controls corresponding to the information display positions of the at least one second user based on the first position status information.

If statuses of the information display positions indicated by the first position status information are different, display statuses of the adjustment controls corresponding to the information display positions of the second user are different.

In the embodiments of this application, the first terminal displays the adjustment controls corresponding to the at least one second user based on the first position status information.

In a possible implementation, a second adjustment control is displayed in the first display status in response to the first position status information indicating that the information display position of the second target user has not been exchanged.

The second target user is any one of the at least one second user, and the second adjustment control is the adjustment control corresponding to the second target user. The adjustment control in the first display status may accept a trigger operation, and when the trigger operation is received, a position exchange is applied for to the user corresponding to the adjustment control.

In a possible implementation, in response to the first position status information including the adjustment status information of the second target user, when the first position status information received by the first terminal indicates that the adjustment status information of the second target user is in a default status, an applied status or an applying status, it indicates that the information display position of the second target user has not been exchanged, and the second adjustment control is displayed in the first display status.

For example, the adjustment status information may be stored in the server in the form of an array. If the adjustment status information corresponding to the second target user is "None", it indicates that the second target user is in the default status. That is, the second target user does not receive the application for the position exchange, does not transmit the application for the position exchange to other users, or does not exchange the position with other users. If the adjustment status information corresponding to the second target user is "APPLY", it indicates that the second target user is in the applying status. That is, the second target user transmits a request for applying for the position exchange to the server, and the position has not been exchanged. If the adjustment status information corresponding to the second target user is "ACCEPT", it indicates that the second target user is in the applied status. That is, the server transmits a request for applying for the position exchange to the second target user, and the position has not been exchanged. If the adjustment status information corresponding to the second target user is "EXCHANGED", it indicates that the second target user is in the exchanged status. In response to a maximum quantity of exchanges of the information display position of each user being 1, when the adjustment status information is "EXCHANGED", it can further indicate that the second target user is in a non-exchangeable status, that is, the position has been exchanged by the second target user.

That is, when the first position status information indicates that the second target user is in any one of the default status, the applying status, or the applied status, the second adjustment control is displayed in the first display status.

In a possible implementation, the second adjustment control is displayed in a third display status in response to the first position status information indicating that the second target user requests for an information display position exchange with the first user.

For example, when the first position status information transmitted by the server to the first terminal includes the adjustment status information and the application relationship information, that is, the first position status information includes that the adjustment status information of the first user is the applied status, the adjustment status information of the second target user is the applying status, and there is an applying relationship between the first user and the second target user, the display status of the second adjustment control corresponding to the second target user whose adjustment status information is the applying status is adjusted to the third display status.

In a possible implementation, the second adjustment control is in the third display status, which may be used for instructing the second adjustment control to support a user in an applied status (the first user) to perform a trigger operation to agree to a position exchange with the user who initiates a position exchange application.

The first user performs a trigger operation on the second adjustment control in the third display status, which may be used for indicating that the first user agrees to a position exchange with the second target user.

In a possible implementation, a third selection screen is displayed in response to receiving the trigger operation by the first user on the second adjustment control in the third display status, the third selection screen being a screen obtained after the information display position of the first user is exchanged with the information display position of the second target user.

Figure 6:
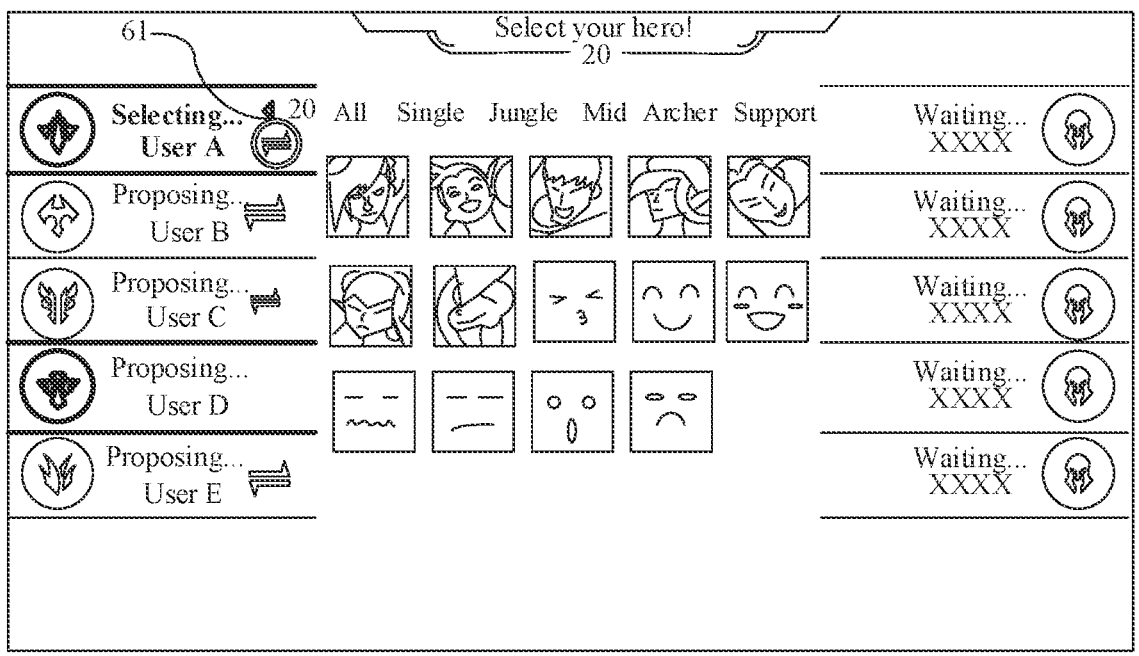
FIG. 6 is a schematic diagram of a display process interface of an adjustment control in a third display status involved in the embodiment shown in FIG. 4.

For example, FIG. 6 is a schematic diagram of a display process interface of an adjustment control of a third display status involved in the embodiments of this application. As shown in FIG. 6, if user D is the first user and user A is the second target user, when user A performs a trigger operation on an adjustment control of user D in the first display status on a terminal corresponding to user A, the terminal corresponding to user A transmits an adjustment application to the server based on the trigger operation, where the adjustment application may include identification information of user A, identification information of user D. and application relationship information. Correspondingly, the server receives the adjustment application, updates the adjustment status information of user D to the applied status, and updates the adjustment status information of user A to the applying status based on the adjustment application. In a possible case, the server may determine that a display status of a second adjustment control 61 corresponding to user A displayed on the first terminal is the third display status, and directly transmits indication information that the control status information is the third display status to the first terminal. The first terminal displays the second adjustment control 61 in the third display status based on the indication information. In another possible case, the server may transmit the adjustment status information of user D and the adjustment status information of user A to the first terminal based on the application relationship information included in the adjustment application. The first terminal determines the display status of the second adjustment control as the third display status, and displays the third display status.

In a possible implementation, the second adjustment control is displayed in a fourth display status or displaying the second adjustment control is canceled in response to the first position status information indicating that the information display position of the second target user has been exchanged. The fourth display status is an inoperable status.

In a possible implementation, in response to a maximum quantity of exchanges of the information display position of each user being 1, when the second selection screen is displayed, the adjustment controls corresponding to the at least one second user are displayed in the fourth display status; or when the second selection screen is displayed, displaying the adjustment controls corresponding to the at least one second user is canceled.

The position has been exchanged when the first terminal displays the second selection screen, and therefore the adjustment controls corresponding to all second users included in the virtual character selection interface may be displayed in the fourth display status, or displaying the adjustment controls corresponding to all second users included in the virtual character selection interface may be canceled.

In a possible implementation, the second adjustment control is displayed in the fourth display status in response to the second target user completing the virtual character selection; or displaying the second adjustment control is canceled in response to the second target user completing the virtual character selection.

For example, if the second target user located on the first floor is selecting the virtual character at a first time point, the second adjustment control in the first display status is displayed on the first terminal at the first time point. If the second target user completes the virtual character selection at a second time point, the second adjustment control in the fourth display status is displayed on the first terminal at the second time point, or display of the second adjustment control is canceled.

During the information display position exchange, to annotate the user who initiates the position exchange and the user to whom the position exchange is applied for, annotation may be performed in a manner of displaying an indication control in the screen, where an annotated object may be the user who initiates the position exchange, or may be the user to whom the position exchange is applied for.

In a possible implementation, the at least one second user includes at least two users. In response to the first position status information indicating that a third target user requests for a position exchange with a fourth target user, a first indication control is displayed corresponding to the information display position of the third target user, the first indication control being used for indicating that an exchange object applied for by the third target user is the fourth target user.

The third target user and the fourth target user are any two of the at least two users.

In some embodiments, an identifier of the fourth target user may be displayed corresponding to the first indication control to indicate that an exchange object of the third target user is the fourth target user. For example, if user A is the first user, user C is the third target user, and user D is the fourth target user, when the received first position status information indicates that user C requests for a position exchange with user D, a first indication control is displayed at the information display position of user C, and an identifier of user D may be displayed on the first indication control.

Figure 7:
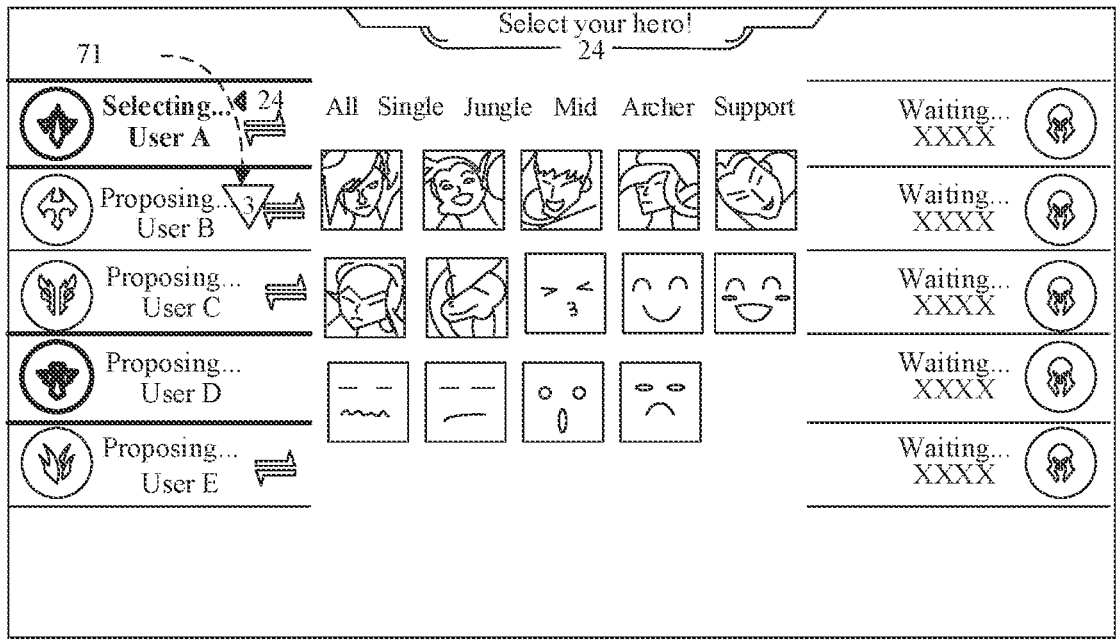
FIG. 7 is a schematic diagram of an application process interface of a position exchange between second users involved in the embodiment shown in FIG. 4.

For example, FIG. 7 is a schematic diagram of an application process interface of a position exchange between second users involved in the embodiments of this application. In this example, the interface is displayed by a terminal corresponding to the first user (user D). When the first position status information transmitted by the server and received by the first terminal includes information that user B transmits a position exchange application to user C, a first indication control 71 is displayed at the information display position corresponding to user B, and an identifier corresponding to user C is displayed on the first indication control 71, that is, the identifier may be a floor number 3 of user C at the current moment.

In another possible implementation, the at least one second user includes at least two users; and in response to the first position status information indicating that a third target user requests for a position exchange with a fourth target user, a second indication control is displayed corresponding to the information display position of the fourth target user, the second indication control being used for indicating that a user who applies for the position exchange with the fourth target user is the third target user.

The third target user and the fourth target user are any two of the at least two users.

In some embodiments, an identifier of the third target user may be displayed corresponding to the second indication control to indicate that the user who applies for the position exchange with the fourth target user is the third target user. For example, if user A is the first user, user C is the third target user, and user D is the fourth target user, when the received first position status information indicates that user C requests for a position exchange with user D, a second indication control is displayed at the information display position of user D, and an identifier corresponding to user C may be displayed on the second indication control.

Figure 8:
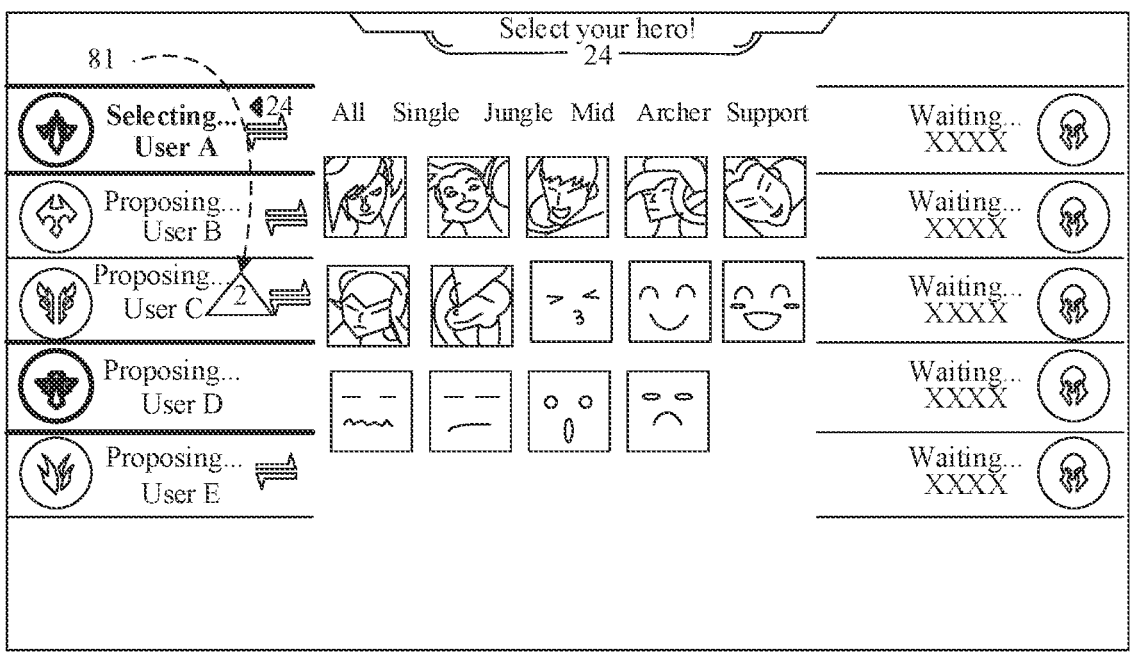
FIG. 8 is a schematic diagram of an application process interface of a position exchange between second users involved in the embodiment shown in FIG. 4.

For example, FIG. 8 is a schematic diagram of an application process interface of a position exchange between second users involved in the embodiments of this application. As shown in FIG. 8, FIG. 8 is a schematic diagram of an interface displayed by a terminal corresponding to the first user (user D). When the first position status information transmitted by the server and received by the first terminal includes information that user B transmits a position exchange application to user C, a second indication control 81 is displayed at the information display position corresponding to user B, and an identifier corresponding to user B is displayed on the second indication control 81, that is, the identifier may be a floor number 2 of user B at the current moment.

In a possible implementation, the at least one second user includes at least two users; and a third adjustment control and a fourth adjustment control are displayed in a fourth display status in response to the first position status information indicating that a third target user requests for a position exchange with a fourth target user.

The fourth display status is an inoperable status; the third adjustment control is an adjustment control corresponding to the third target user; and the fourth adjustment control is an adjustment control corresponding to the fourth target user, thereby avoiding a waste of computing resources of the server caused by redundant operations caused by a plurality of users operating on the same adjustment control.

For example, if user A is the first user, user C is the third target user, and user D is the fourth target user, when the received first position status information indicates that user C requests for a position exchange with user D, or that user D requests for a position exchange with user C, the adjustment control corresponding to user C and the adjustment control corresponding to user D are displayed in the fourth display status.

Figure 9:
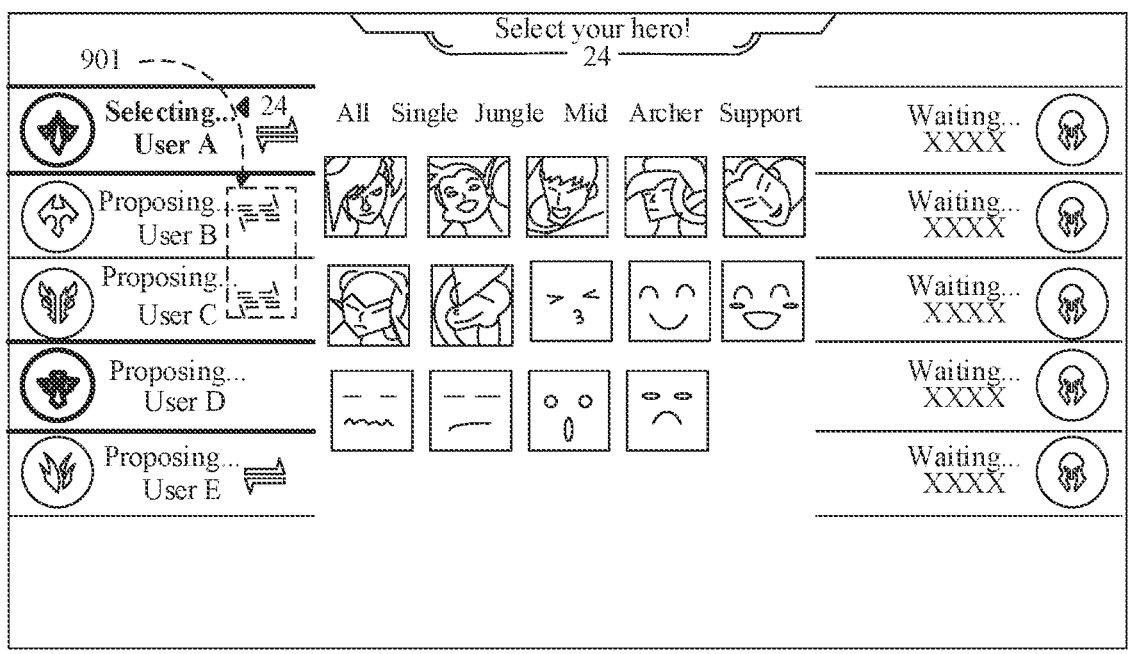
FIG. 9 is a schematic diagram of an application process interface of a position exchange between second users involved in the embodiment shown in FIG. 4.

For example, FIG. 9 is a schematic diagram of an application process interface of a position exchange between second users involved in the embodiments of this application. In this example, the interface is displayed by a terminal corresponding to the first user (user D). When the first position status information transmitted by the server and received by the first terminal includes information about the position exchange application between user B and user C, adjustment controls 901 respectively corresponding to user B and user C are displayed in the fourth display status.

The solutions shown in FIG. 7 to FIG. 9 can explicitly indicate a position exchange application among other players, so that the users properly plan a position exchange application object, thereby improving the interaction efficiency of the position exchange. An explicit display manner of the position exchange application may be any one of the foregoing manners, and this is not limited in this application.

Step 404. Display, in response to a first adjustment control being in a first display status and receiving a trigger operation on the first adjustment control, the first adjustment control in a second display status.

The first adjustment control is any one of the adjustment controls corresponding to the at least one second user; and the second display status is used for indicating to wait for a user to accept a position exchange.

In a possible implementation, the first terminal transmits a position adjustment request to the server in response to the first adjustment control being in the first display status and receiving the trigger operation on the first adjustment control; and the first terminal receives second position status information transmitted by the server, and displays the first adjustment control in the second display status based on the second position status information.

The position adjustment request is used for requesting for a position exchange with the first target user. The position adjustment request may include an identification of the first user who applies for the position adjustment and an identification of the first target user to whom the position adjustment is applied for. The second position status information is generated by the server based on the position adjustment request.

Figure 10:
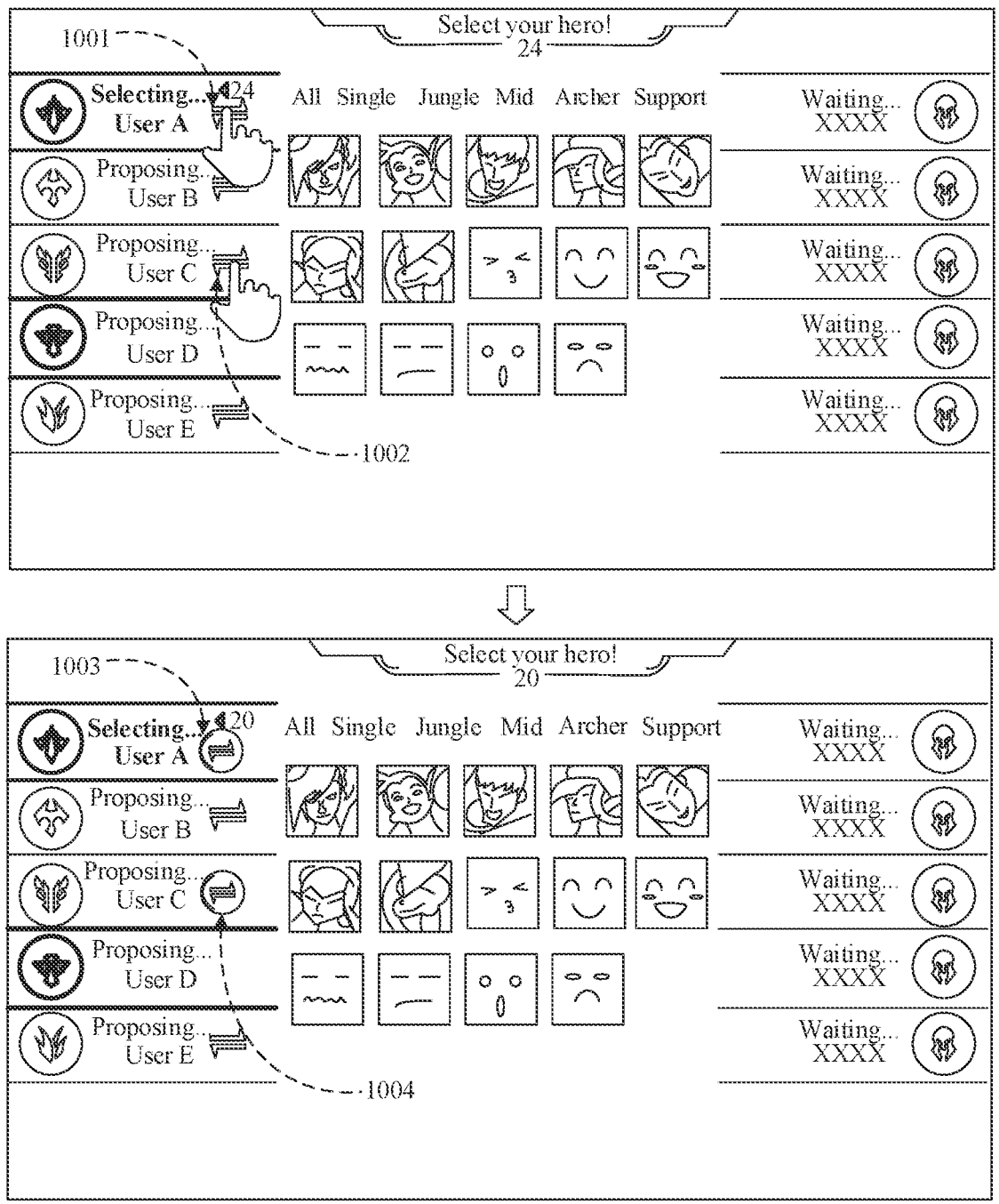
FIG. 10 is a schematic diagram of an interface displaying a first adjustment control involved in the embodiment shown in FIG. 4.

For example, FIG. 10 is a schematic diagram of an interface displaying a first adjustment control involved in the embodiments of this application. As shown in FIG. 10, when the first user (user D) performs a trigger operation on an adjustment control 1001 in the first display status corresponding to user A and on an adjustment control 1002 in the first display status corresponding to user C, a position adjustment request corresponding to user A and a position adjustment request corresponding to user C are transmitted to the server. When receiving the second position status information corresponding to user A and the second position status information corresponding to user C from the server, the first terminal displays a first adjustment control 1003 in the second display status at the information display position of user A and displays a first adjustment control 1004 in the second display status at the information display position of user C in the virtual character selection interface.

Step 405. Adjust a display status of the first adjustment control from the second display status to the first display status in response to receiving the trigger operation on the first adjustment control in the second display status.

In the embodiments of this application, after the first user transmits a request to the first target user for the information display position exchange, when the first user needs to cancel the information display position exchange corresponding to the first target user while to wait for the first target user to determine whether to agree to the information display position exchange, the first user may perform a trigger operation on the first adjustment control in the second display status to adjust a display status of the first adjustment control from the second display status to the first display status.

In a possible implementation, in response to the trigger operation performed by the first user on the first adjustment control in the second display status, a request is transmitted to the server to request the server to transmit new position status information, and the display status of the first adjustment control is adjusted from the second display status to the first display status based on the received new position status information transmitted by the server.

By performing the trigger operation on the first adjustment control in the second display status to cancel the position exchange application, when the adjustment control is mistakenly operated, the wrong operation can be canceled in time, thereby improving the interaction effect of the position exchange process.

Step 406. Display a second selection screen in response to the trigger operation on the first adjustment control being accepted by a first target user.

The second selection screen is a screen obtained after the information display position of the first user is exchanged with the information display position of the first target user; and the first target user is a second user corresponding to the first adjustment control.

In a possible implementation, an exchange animation for exchanging the information display position of the first user with the information display position of the first target user is displayed in response to the trigger operation on the adjustment control being accepted by the first target user; and the second selection screen is displayed in response to the exchange animation being displayed completely.

Figure 11:
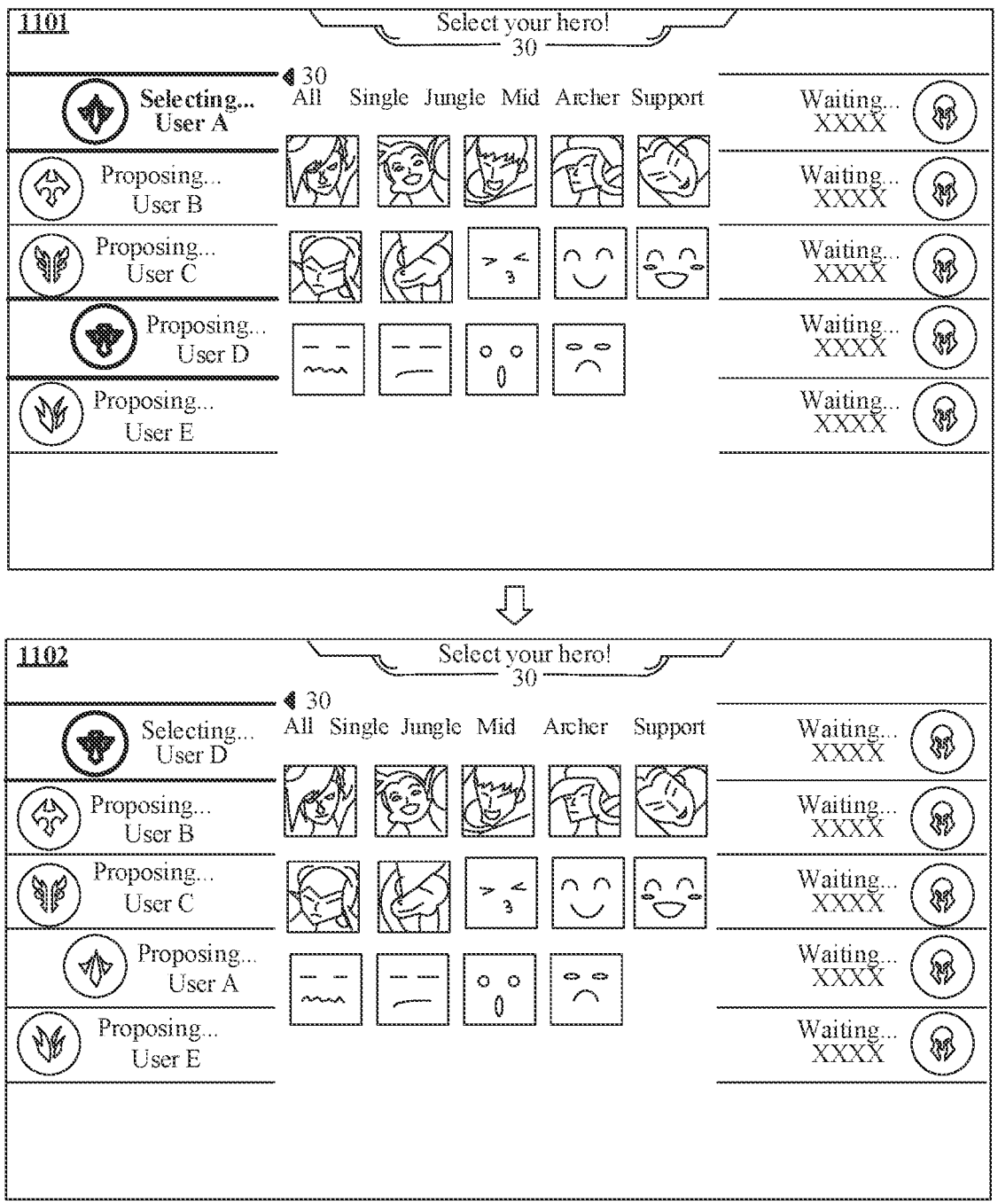
FIG. 11 is a schematic diagram of a display process of an exchange animation involved in the embodiment shown in FIG. 4.

For example, FIG. 11 is a schematic diagram of a display process of an exchange animation involved in the embodiments of this application. As shown in FIG. 11, when the target user agrees to the position exchange with the first user by triggering the adjustment control corresponding to the first user, an animation start screen 1101 is displayed on the first terminal. No adjustment control is displayed on the animation start screen 1101, the information display position corresponding to the first user that needs the position exchange is proposed to be exchanged with the information display position corresponding to the target user, and finally, an animation end screen 1102 is displayed. No adjustment control is displayed on the animation end screen 1102, and the information display position of user D is successfully exchanged with the information display position of user A and is displayed.

In a possible implementation, third position status information transmitted by the server is received, and a second selection screen is displayed based on the third position status information.

The third position status information is generated by the server in response to the trigger operation on the first adjustment control being accepted by the first target user.

For example, after performing the trigger operation on the first adjustment control, the first user transmits a position adjustment request to the server. The server transmits the first position status information to a first target terminal based on the position adjustment request, and the first target terminal displays an adjustment control in a third display status corresponding to the first user based on the first position status information. In response to the trigger operation performed by the first target user on the adjustment control in the third display status corresponding to the first user, it indicates that the first target user agrees to a position exchange with the first user, and transmits corresponding information that agrees to exchange to the server. The server performs the floor exchange on the first user and the first target user based on the corresponding information that agrees to exchange, and transmits all information display positions after the exchange to all terminals, so that all the terminals synchronously update the screen, that is, all the terminals display a second selection screen after the exchange.

Figure 12:
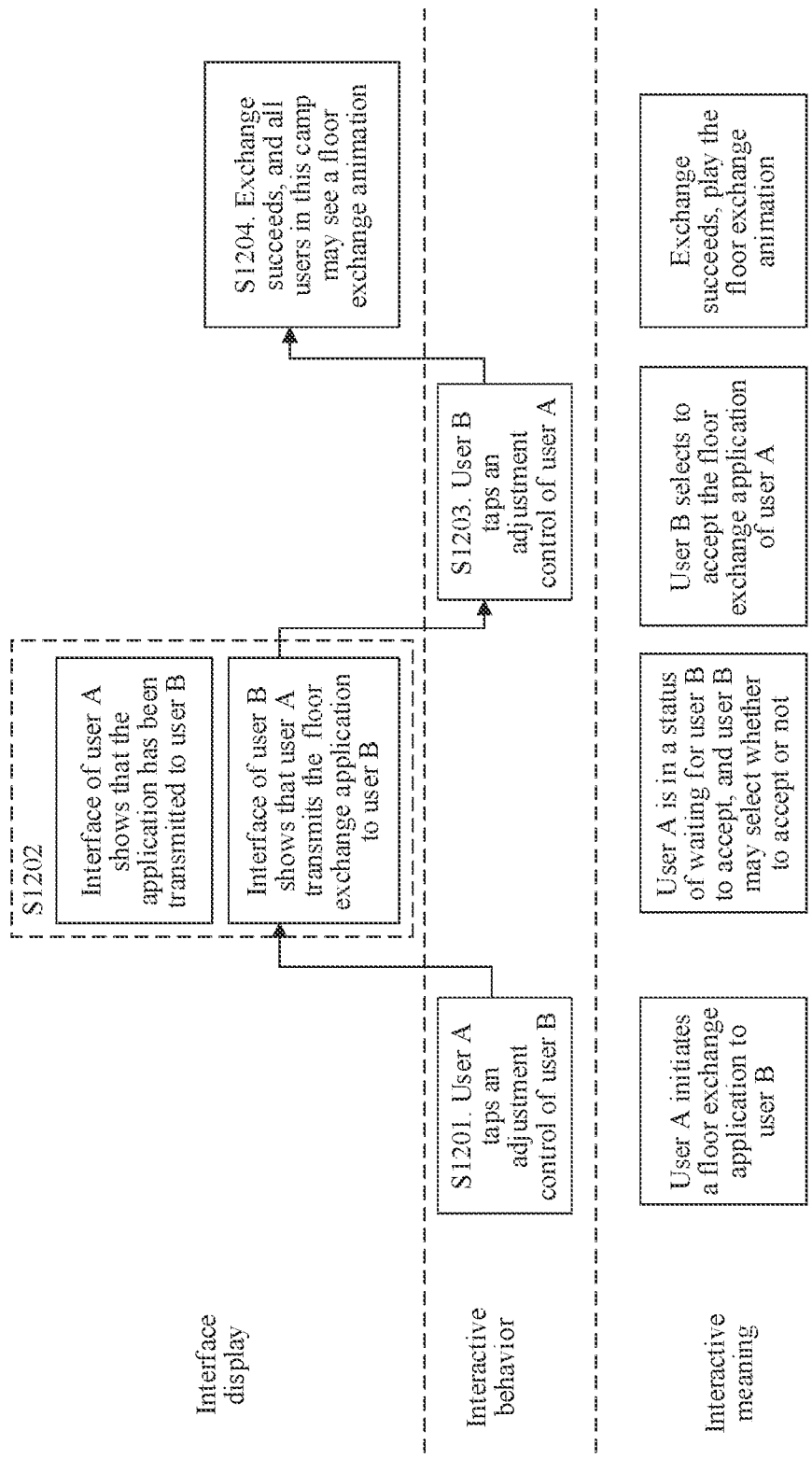
FIG. 12 is a schematic flowchart of a virtual character sequence adjustment method involved in the embodiment shown in FIG. 4.

For example, FIG. 12 is a schematic diagram of a flowchart of a virtual character sequence adjustment method involved in the embodiments of this application. As shown in FIG. 12, user A taps on his terminal the adjustment control of user B, to indicate that user A initiates a floor exchange application with user B (S1201). The floor exchange application request from user A to user B is displayed on the display interface of a terminal corresponding to user A. The floor exchange application request from user A to user B is displayed on the display interface of a terminal corresponding to user B. Currently, user A is in a status of waiting for user B to accept the floor exchange application, and user B may select whether to accept the floor exchange application (S1202). The user B taps the adjustment control of user A on the user interface of his terminal, thereby selecting to accept the floor exchange application of user A (S1203). After user A and user B successfully exchange floors, user A and user B may display a floor exchange animation on the display interface of all users belonging to the same camp (S1204).

In summary, in this application, by displaying an information display position of a first user and information display positions of at least one second user, a virtual character selection sequence of a corresponding user can be determined based on the information display position. By displaying an adjustment control at the information display position of the second user, and performing a trigger operation on a first adjustment control, a display status of the first adjustment control can be adjusted from a first display status to a second display status. After a first target user agrees to an information display position exchange, a screen generated after the position exchange is displayed, so that a first terminal completes the adjustment of the virtual character selection sequence. After the trigger operation on the first adjustment control is received, the display status of the first adjustment control changes, to prompt the first user that a position exchange has been applied for to the first target user, which can improve the visual effect during position exchange, and improve the interaction efficiency during position exchange, thereby improving the user interaction efficiency during virtual character selection.

Figure 13:
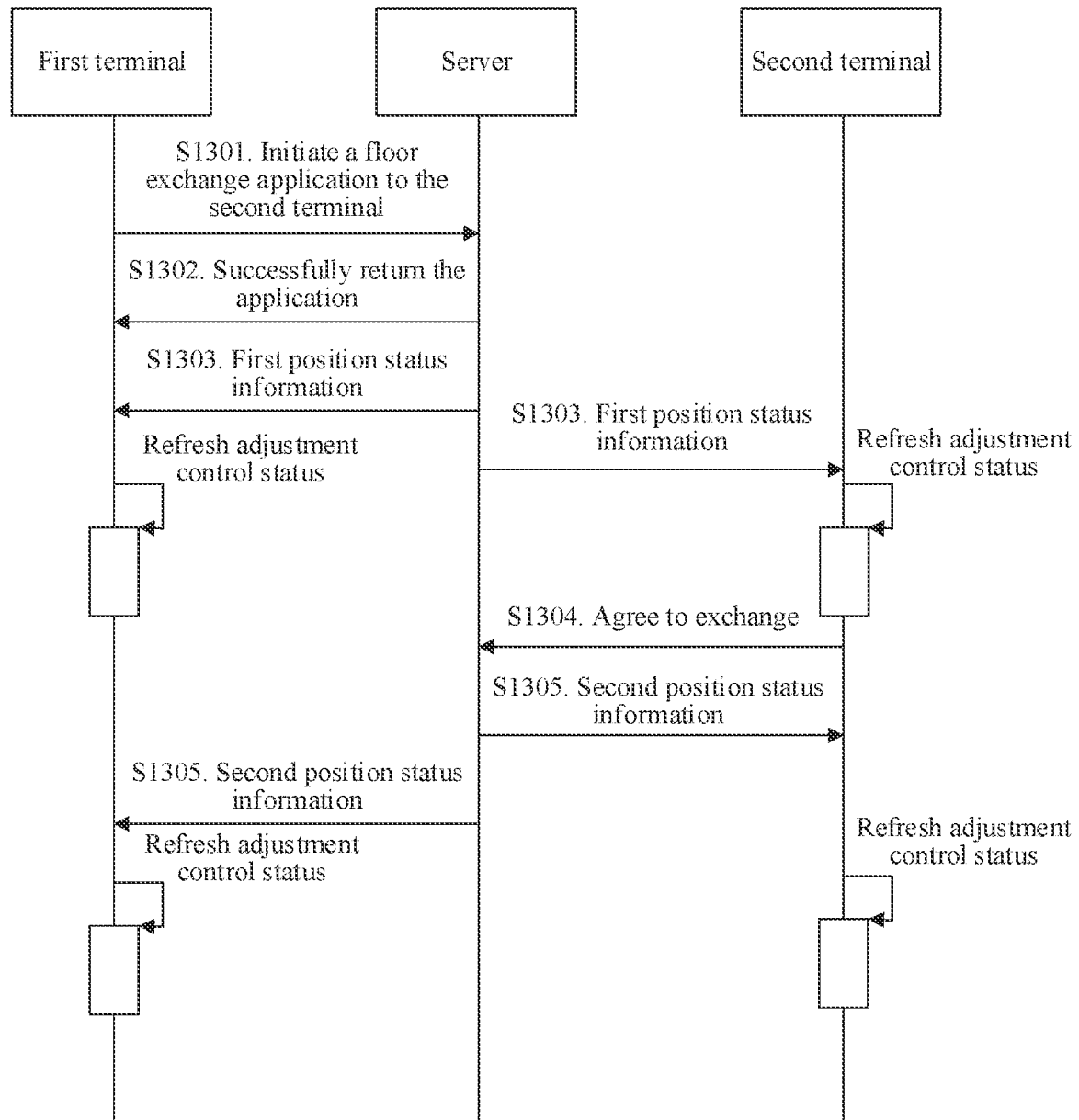
FIG. 13 is a flowchart of a virtual character selection sequence adjustment method according to an exemplary embodiment of this application.

FIG. 13 is a flowchart of a virtual character selection sequence adjustment method according to an exemplary embodiment of this application. An example in which the virtual character selection sequence adjustment method is performed by a first terminal, a second terminal, and a server in an interactive manner is used. As shown in FIG. 13, the first terminal displays a virtual character selection interface, and the first terminal displays an adjustment control at an information display position of at least one second user, and the first terminal receives a trigger operation on the adjustment control in response to the adjustment control being in a first display status, and transmits an adjustment request corresponding to the adjustment control to the server (S1301). The server receives the adjustment request, and transmits request response information corresponding to the successfully received adjustment request to the first terminal (S1302). The server transmits first position status information to the first terminal and the second terminal (S1303).

The first terminal and the second terminal respectively perform an update operation on the adjustment control based on the received first position status information, displays the adjustment control corresponding to the updated display status, and after performing a trigger operation on the adjustment control at the information display position of the first user based on the received first position status information, the second terminal transmits an adjustment approval instruction to the server (S1304). The server exchanges the information display position of the first user with the information display position of the target user to generate second selection screen, and respectively transmits second position status information to the first terminal and the second terminal (S1305). The first terminal and the second terminal respectively update the floor status and display the second selection screen.

In summary, in this application, by displaying an information display position of a first user and information display positions of at least one second user, a virtual character selection sequence of a corresponding user can be determined based on the information display position. By displaying an adjustment control at the information display position of the second user, and performing a trigger operation on a first adjustment control, a display status of the first adjustment control can be adjusted from a first display status to a second display status. After a first target user agrees to an information display position exchange, a screen generated after the position exchange is displayed, so that a first terminal completes the adjustment of the virtual character selection sequence. After the trigger operation on the first adjustment control is received, the display status of the first adjustment control changes, to prompt the first user that a position exchange has been applied for to the first target user, which can improve the visual effect during position exchange, and improve the interaction efficiency during position exchange, thereby improving the user interaction efficiency during virtual character selection.

Figure 14:
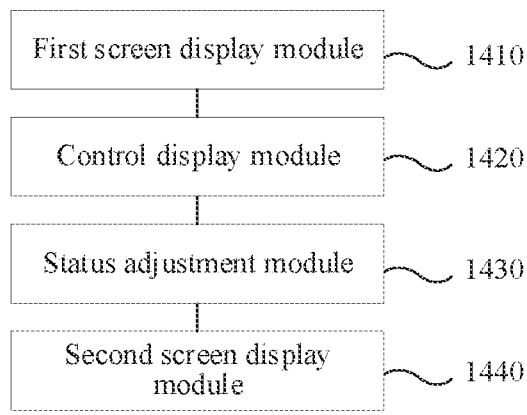
FIG. 14 is a structural block diagram of a virtual character selection sequence adjustment apparatus according to an exemplary embodiment of this application.

FIG. 14 is a structural block diagram of a virtual character selection sequence adjustment apparatus according to an exemplary embodiment. The apparatus may perform all or some steps in the method shown in the embodiment corresponding to FIG. 3 or FIG. 4. The virtual character selection sequence adjustment apparatus may include:

a first screen display module 1410, configured to display a first selection screen, the first selection screen including an information display position of a first user and information display positions of at least one second user, the information display position being used for indicating a virtual character selection sequence of each user; and the first user being a user corresponding to the first terminal;

a control display module 1420, configured to display adjustment controls corresponding to the information display positions of the at least one second user;

a status adjustment module 1430, configured to display, in response to a first adjustment control being in a first display status and receiving a trigger operation on the first adjustment control, the first adjustment control in a second display status, the first adjustment control being any one of the adjustment controls corresponding to the at least one second user; and the second display status being used for indicating to wait for a user to accept a position exchange;

a second screen display module 1440, configured to display a second selection screen in response to the trigger operation on the first adjustment control being accepted by a first target user, the second selection screen being a screen obtained after the information display position of the first user is exchanged with the information display position of the first target user; and the first target user being a user corresponding to the first adjustment control.

In a possible implementation, the control display module 1420 includes:
- an information receiving submodule, configured to receive first position status information transmitted by a server, the first position status information being used for indicating an exchange status of the information display positions of the at least one second user; and
- a control display submodule, configured to display the adjustment controls corresponding to the information display positions of the at least one second user based on the first position status information.

In a possible implementation, the control display submodule includes:
- a first status display unit, configured to display a second adjustment control in the first display status in response to the first position status information indicating that the information display position of the second target user has not been exchanged; the second target user being any one of the at least one second user, and the second adjustment control being the adjustment control corresponding to the second target user;
- a second status display unit, configured to display the second adjustment control in a third display status in response to the first position status information indicating that the second target user requests for an information display position exchange with the first user;
- a third status display unit, configured to display the second adjustment control in a fourth display status or cancel displaying the second adjustment control in response to the first position status information indicating that the information display position of the second target user has been exchanged; and the fourth display status being an inoperable status.

In a possible implementation, the at least one second user includes at least two users; and
the control display submodule includes:
- a first control display unit, configured to display, in response to the first position status information indicating that a third target user requests for a position exchange with a fourth target user, a first indication control corresponding to the information display position of the third target user, the first indication control being used for indicating that an exchange object applied for by the third target user is the fourth target user,
the third target user and the fourth target user being any two of the at least two users.

In a possible implementation, the at least one second user includes at least two users; and
the control display submodule includes:
- a second control display unit, configured to display, in response to the first position status information indicating that a third target user requests for a position exchange with a fourth target user, a second indication control corresponding to the information display position of the fourth target user, the second indication control being used for indicating that a user who applies for the position exchange with the fourth target user is the third target user,
the third target user and the fourth target user being any two of the at least two users.

In a possible implementation, the at least one second user includes at least two users; and
the control display submodule includes:
- a fourth status display unit, configured to display a third adjustment control and a fourth adjustment control in a fourth display status in response to the first position status information indicating that a third target user requests for a position exchange with a fourth target user, the fourth display status being an inoperable status, the third adjustment control being the adjustment control corresponding to the third target user, and the fourth adjustment control being the adjustment control corresponding to the fourth target user.

In a possible implementation, the apparatus further includes:
- a fifth status display unit, configured to display the adjustment controls corresponding to the at least one second user in the fourth display status during displaying of the second selection screen; or
- a first control cancellation unit, configured to cancel displaying the adjustment controls corresponding to the at least one second user during displaying of the second selection screen.

In a possible implementation, the apparatus further includes:
- a sixth status display unit, configured to display the second adjustment control in the fourth display status in response to the second target user completing the virtual character selection; or
- a second control cancellation unit, configured to cancel displaying the second adjustment control in response to the second target user completing the virtual character selection.

In a possible implementation, the status adjustment module 1430 includes:
- a request transmission submodule, configured to transmit a position adjustment request to the server in response to the first adjustment control being in the first display status and receiving the trigger operation on the first adjustment control, the position adjustment request being used for requesting for a position exchange with the first target user;
- a second information receiving submodule, configured to receive second position status information transmitted by the server, the second position status information being generated by the server based on the position adjustment request; and
- a status display submodule, configured to display the first adjustment control in the second display status based on the second position status information.

In a possible implementation, the second screen display module 1440 includes:
- a third information receiving submodule, configured to receive third position status information transmitted by the server, the third position status information being generated by the server in response to the trigger operation on the first adjustment control being accepted by the first target user; and
- a first screen display submodule, configured to display the second selection screen based on the third position status information.

In a possible implementation, the second screen display module 1440 includes:
- an animation display submodule, configured to display an exchange animation for exchanging the information display position of the first user with the information display position of the first target user in response to the trigger operation on the first adjustment control being accepted by the first target user; and a second screen display submodule, configured to display the second selection screen in response to completing the exchange animation display.

In a possible implementation, the apparatus further includes:

a status cancellation module, configured to: before the second selection screen is displayed in response to the trigger operation on the first adjustment control being accepted by the first target user, adjust a display status of the first adjustment control from the second display status to the first display status in response to receiving the trigger operation on the first adjustment control in the second display status.

In summary, in this application, by displaying an information display position of a first user and information display positions of at least one second user, a virtual character selection sequence of a corresponding user can be determined based on the information display position. By displaying an adjustment control at the information display position of the second user, and performing a trigger operation on a first adjustment control, a display status of the first adjustment control can be adjusted from a first display status to a second display status. After a first target user agrees to an information display position exchange, a screen generated after the position exchange is displayed, so that a first terminal completes the adjustment of the virtual character selection sequence. After the trigger operation on the first adjustment control is received, the display status of the first adjustment control changes, to prompt the first user that a position exchange has been applied for to the first target user, which can improve the visual effect during position exchange, and improve the interaction efficiency during position exchange, thereby improving the user interaction efficiency during virtual character selection.

Figure 15:
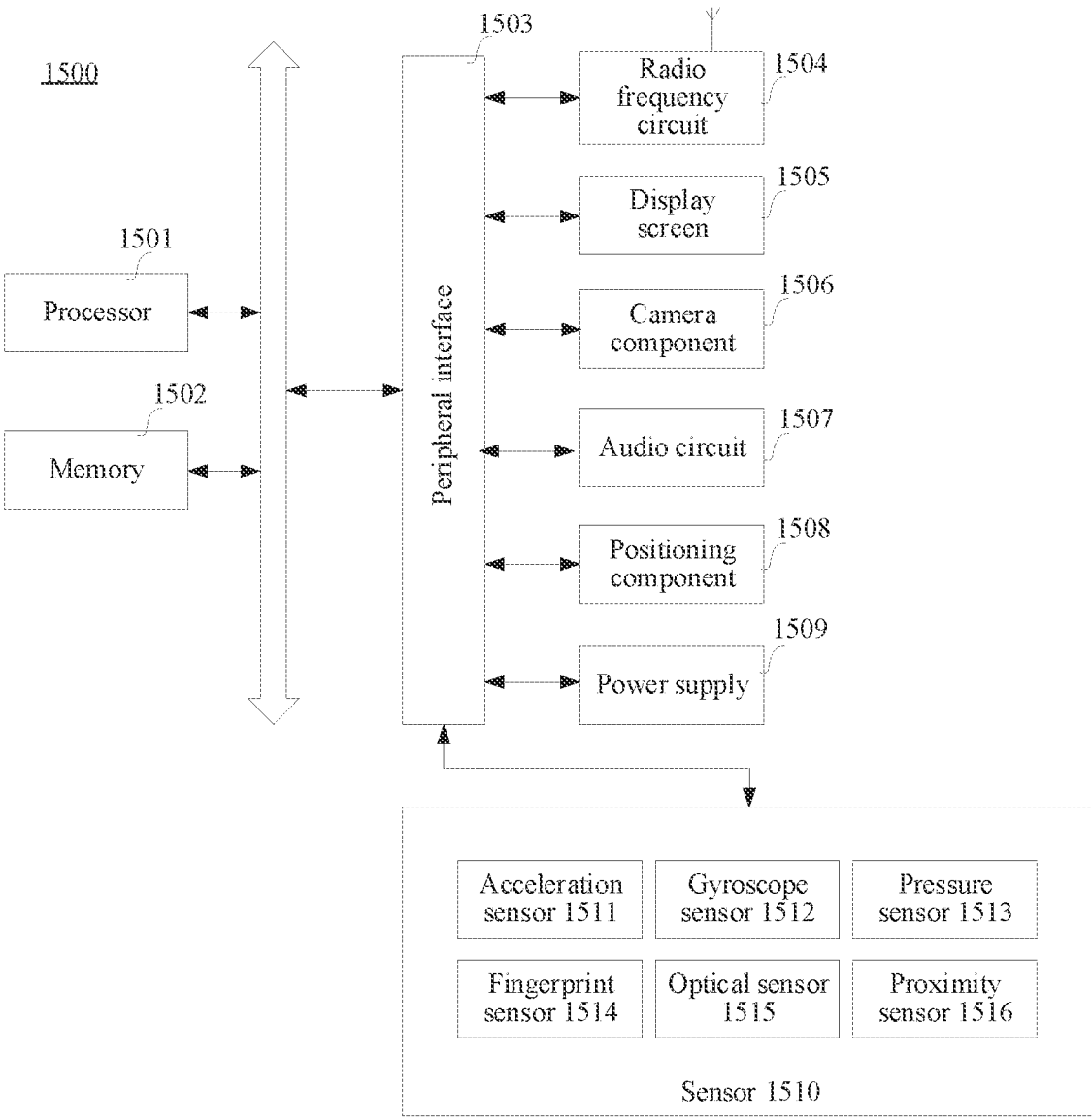
FIG. 15 is a structural block diagram of a computer device according to an exemplary embodiment of this application.

FIG. 15 is a structural block diagram of a computer device 1500 according to an exemplary embodiment. The computer device 1500 may be a user terminal, such as a smartphone, a tablet computer, a MP3 player, a MP4 player, a notebook computer, or a desktop computer. The computer device 1500 may also be referred to as another name such as user equipment, a portable terminal, a laptop terminal, or a desktop terminal.

Generally, the computer device 1500 includes a processor 1501 and a memory 1502.

In some embodiments, the computer device 1500 further includes a peripheral interface 1503 and at least one peripheral. The processor 1501, the memory 1502, and the peripheral interface 1503 may be connected through a bus or a signal cable. Each peripheral may be connected to the peripheral interface 1503 through a bus, a signal cable, or a circuit board. Specifically, the peripheral includes: at least one of a radio frequency (RF) circuit 1504, a display screen 1505, a camera component 1506, an audio frequency circuit 1507, a positioning component 1508, and a power source 1509.

In some embodiments, the computer device 1500 further includes one or more sensors 1510. The one or more sensors 1510 include, but are not limited to: an acceleration sensor 1511, a gyro sensor 1512, a pressure sensor 1513, a fingerprint sensor 1514, an optical sensor 1515, and a proximity sensor 1516.

A person skilled in the art may understand that the structure shown in FIG. 15 does not constitute any limitation on the computer device 1500, and the computer device may include more components or fewer components than those shown in the figure, or some components may be combined, or a different component deployment may be used.

In an exemplary embodiment, a non-temporary computer-readable storage medium including an instruction is further provided. For example, the non-temporary computer-readable storage medium includes at least one instruction, at least one program, a code set, or an instruction set. The at least one instruction, the at least one program, the code set, or the instruction set may be executed by a processor to implement all or some steps in the method shown in the embodiment corresponding to FIG. 3 or FIG. 4.

According to an aspect of this application, a computer program product or a computer program is provided, the computer program product or the computer program including computer instructions, the computer instructions being stored in a computer-readable storage medium. A processor of a terminal reads the computer instructions from the computer-readable storage medium, and executes the computer instructions, so that the terminal performs the virtual character selection sequence adjustment method provided in the exemplary implementations of the foregoing aspect.

Other embodiments of this application will be apparent to a person skilled in the art from consideration of the specification and practice of the disclosure here. This application is intended to cover any variations, uses or adaptive changes of this application. Such variations, uses or adaptive changes follow the general principles of this application, and include well-known knowledge and conventional technical means in the art that are not disclosed in this application. This specification and the embodiments are merely for an illustration purpose, and the real scope and spirit of this application are pointed out in the following claims.

It is to be understood that, this application is not limited to the accurate structures that are described above and that are shown in the accompanying drawings, and modifications and changes may be made without departing from the scope of this application. The scope of this application is limited by the appended claims only.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

As used herein, the term "unit" or "module" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit. The division of the foregoing functional modules is merely used as an example for description when the systems, devices, and apparatus provided in the foregoing embodiments performs adjustment control and/or selection screen display. In practical application, the foregoing functions may be allocated to and completed by different functional modules according to requirements, that is, an inner structure of a device is divided into different functional modules to implement all or a part of the functions described above.

What is claimed is:

1. A virtual character selection sequence adjustment method, performed by a first terminal associated with a first user of a gaming application, the method comprising:
   displaying a first selection screen that includes a plurality of information display positions displayed in a first order, the plurality of information display positions including (i) an information display position of the first user and (ii) respective information display positions of second users of the gaming application, each of the information display positions indicating a virtual character selection sequence for the first user and the second users;
   displaying adjustment controls corresponding to the information display positions of the second users;
   receiving a trigger operation on a first adjustment control, corresponding to a respective one of the second users;
   in accordance with receiving the trigger operation on the first adjustment control:
      changing the first adjustment control from a first display status to a second display status, the second display status indicating that a corresponding second user is waiting to accept a position exchange with the first user; and
   in response to a determination that the trigger operation on the first adjustment control is accepted by a first target user of the second users, displaying a second selection screen that includes the plurality of information display positions displayed in a second order different from the first other, the second order including an exchange between the information display position of the first user and the information display position of the first target user.

2. The method according to claim 1, wherein displaying the adjustment controls comprises:
   receiving first position status information from a server, the first position status information indicating an exchange status of the information display positions of the second users; and
   displaying the adjustment controls corresponding to the information display positions of the second users based on the first position status information.

3. The method according to claim 2, wherein displaying the adjustment controls comprises:
   displaying a second adjustment control in the first display status in response to the first position status information indicating that the information display position of a second target user has not been exchanged, the second target user being any one of the second users, and the second adjustment control being the adjustment control corresponding to the second target user;
   displaying the second adjustment control in a third display status in response to the first position status information indicating that the second target user requests for an information display position exchange with the first user;
   displaying the second adjustment control in a fourth display status or canceling displaying the second adjustment control in response to the first position status information indicating that the information display position of the second target user has been exchanged, the fourth display status being an inoperable status.

4. The method according to claim 2, wherein the second users comprises at least two users; and
   displaying the adjustment controls corresponding to the information display positions of the second users comprises:
      in response to the first position status information indicating that a third target user requests for a position exchange with a fourth target user, displaying a first indication control corresponding to the information display position of the third target user, the first indication control being used for indicating that an exchange object applied for by the third target user is the fourth target user,
   wherein the third target user and the fourth target user are any two of the at least two users.

5. The method according to claim 2, wherein the second users comprises at least two users; and
   displaying the adjustment controls corresponding to the information display positions of the second users comprises:
      in response to the first position status information indicating that a third target user requests for a position exchange with a fourth target user, displaying a second indication control corresponding to the information display position of the fourth target user, the second indication control being used for indicating that a user who applies for the position exchange with the fourth target user is the third target user,
   wherein the third target user and the fourth target user being any two of the at least two users.

6. The method according to claim 2, wherein the second users comprises at least two users; and
   displaying the adjustment controls corresponding to the information display positions of the second users comprises:
      in response to the first position status information indicating that a third target user requests for a position exchange with a fourth target user, displaying a third adjustment control and a fourth adjustment control in a fourth display status, the fourth display status being an inoperable status; the third adjustment control being the adjustment control corresponding to the third target user; and the fourth adjustment control being the adjustment control corresponding to the fourth target user.

7. The method according to claim 3, further comprising:
   displaying the adjustment controls corresponding to the second users in the fourth display status during displaying the second selection screen; or
   canceling displaying the adjustment controls corresponding to the second users during displaying the second selection screen.

8. The method according to claim 7, further comprising:
   displaying the second adjustment control in the fourth display status in response to the second target user completing the virtual character selection; or
   canceling displaying the second adjustment control in response to the second target user completing the virtual character selection.

9. The method according to claim 1, wherein displaying the first adjustment control in the second display status comprises:
   transmitting a position adjustment request to the server in response to the first adjustment control being in the first display status and receiving the trigger operation on the first adjustment control, the position adjustment request being used for requesting for a position exchange with the first target user;

receiving second position status information transmitted by the server, the second position status information being generated by the server based on the position adjustment request; and displaying the first adjustment control in the second display status based on the second position status information.

10. The method according to claim 9, wherein displaying the second selection screen comprises:

receiving third position status information transmitted by the server, the third position status information being generated by the server in response to the trigger operation on the first adjustment control being accepted by the first target user; and displaying the second selection screen based on the third position status information.

11. The method according to claim 1, wherein displaying the second selection screen comprises:

displaying an exchange animation for exchanging the information display position of the first user with the information display position of the first target user in response to the trigger operation on the first adjustment control being accepted by the first target user; and displaying the second selection screen in response to the exchange animation being displayed completely.

12. The method according to claim 1, further comprising before displaying the second selection screen:

adjusting a display status of the first adjustment control from the second display status to the first display status in response to receiving the trigger operation on the first adjustment control in the second display status.

13. An electronic device associated with a first user of a gaming application, comprising:

a display;

one or more processors; and memory storing one or more programs, the one or more programs comprising instructions that, when executed by the one or more processors, cause the one or more processors to perform operations comprising:

displaying a first selection screen that includes a plurality of information display positions displayed in a first order, the plurality of information display positions including (i) an information display position of the first user and (ii) respective information display positions of second users of the gaming application, each of the information display positions indicating a virtual character selection sequence for the first user and the second users;

displaying adjustment controls corresponding to the information display positions of the second users;

receiving a trigger operation on a first adjustment control, corresponding to a respective one of the second users;

in accordance with receiving the trigger operation on the first adjustment control:

changing the first adjustment control from a first display status to a second display status, the second display status indicating that a corresponding second user is waiting to accept a position exchange with the first user; and in response to a determination that the trigger operation on the first adjustment control is accepted by a first target user of the second users, displaying a second selection screen that includes the plurality of information display positions displayed in a second order different from the first other, the second order including an exchange between the information display position of the first user and the information display position of the first target user.

14. The electronic device according to claim 13, wherein displaying the adjustment controls comprises:

receiving first position status information from a server, the first position status information indicating an exchange status of the information display positions of the second users; and displaying the adjustment controls corresponding to the information display positions of the second users based on the first position status information.

15. The electronic device according to claim 14, wherein displaying the adjustment controls comprises:

displaying a second adjustment control in the first display status in response to the first position status information indicating that the information display position of a second target user has not been exchanged, the second target user being any one of the second users, and the second adjustment control being the adjustment control corresponding to the second target user;

displaying the second adjustment control in a third display status in response to the first position status information indicating that the second target user requests for an information display position exchange with the first user;

displaying the second adjustment control in a fourth display status or canceling displaying the second adjustment control in response to the first position status information indicating that the information display position of the second target user has been exchanged, the fourth display status being an inoperable status.

16. The electronic device according to claim 14, wherein the second users comprises at least two users; and displaying the adjustment controls corresponding to the information display positions of the second users comprises:

in response to the first position status information indicating that a third target user requests for a position exchange with a fourth target user, displaying a first indication control corresponding to the information display position of the third target user, the first indication control being used for indicating that an exchange object applied for by the third target user is the fourth target user, wherein the third target user and the fourth target user are any two of the at least two users.

17. The electronic device according to claim 13, wherein displaying the first adjustment control in the second display status comprises:

transmitting a position adjustment request to the server in response to the first adjustment control being in the first display status and receiving the trigger operation on the first adjustment control, the position adjustment request being used for requesting for a position exchange with the first target user;

receiving second position status information transmitted by the server, the second position status information being generated by the server based on the position adjustment request; and displaying the first adjustment control in the second display status based on the second position status information.

18. A non-transitory computer-readable storage medium, storing a computer program, the computer program, when executed by one or more processors of an electronic device associated with a first user of a gaming application, cause the one or more processors to perform operations comprising:
- displaying a first selection screen that includes a plurality of information display positions displayed in a first order, the plurality of information display positions including (i) an information display position of the first user and (ii) respective information display positions of second users of the gaming application, each of the information display positions indicating a virtual character selection sequence for the first user and the second users;
- displaying adjustment controls corresponding to the information display positions of the second users;
- receiving a trigger operation on a first adjustment control, corresponding to a respective one of the second users;
- in accordance with receiving the trigger operation on the first adjustment control:
  - changing the first adjustment control from a first display status to a second display status, the second display status indicating that a user is waiting to accept a position exchange; and
- in response to a determination that the trigger operation on the first adjustment control is accepted by a first target user of the second users, displaying a second selection screen that includes the plurality of information display positions displayed in a second order different from the first other, the second order including an exchange between the information display position of the first user and the information display position of the first target user.

19. The non-transitory computer-readable storage medium according to claim 18, wherein displaying the adjustment controls comprises:
- receiving first position status information from a server, the first position status information indicating an exchange status of the information display positions of the second users; and
- displaying the adjustment controls corresponding to the information display positions of the second users based on the first position status information.

20. The non-transitory computer-readable storage medium according to claim 18, wherein displaying the second selection screen comprises:
- displaying an exchange animation for exchanging the information display position of the first user with the information display position of the first target user in response to the trigger operation on the first adjustment control being accepted by the first target user; and
- displaying the second selection screen in response to the exchange animation being displayed completely.

* * * * *